(12) United States Patent
Frederick et al.

(10) Patent No.: US 7,402,804 B2
(45) Date of Patent: Jul. 22, 2008

(54) GEOSTEERING OF SOLID MINERAL MINING MACHINES

(75) Inventors: Larry D. Frederick, Huntsville, AL (US); Dwight Medley, Kelso, TN (US)

(73) Assignee: Geosteering Mining Services, LLC, Huntsville, AL (US)

( * ) Notice: Subject to any disclaimer, the term of this patent is extended or adjusted under 35 U.S.C. 154(b) by 0 days.

(21) Appl. No.: 10/924,247

(22) Filed: Aug. 24, 2004

(65) Prior Publication Data

US 2005/0173639 A1 Aug. 11, 2005

Related U.S. Application Data

(63) Continuation of application No. 10/101,374, filed on Mar. 20, 2002, now Pat. No. 6,781,130, which is a continuation-in-part of application No. 09/811,781, filed on Mar. 20, 2001, now abandoned, which is a continuation-in-part of application No. 09/626,744, filed on Jul. 26, 2000, now Pat. No. 6,465,788, which is a continuation-in-part of application No. 09/471,122, filed on Dec. 23, 1999, now Pat. No. 6,435,619.

(60) Provisional application No. 60/276,896, filed on Mar. 20, 2001.

(51) Int. Cl.
*G01T 1/20* (2006.01)
(52) U.S. Cl. .................................. 250/361 R
(58) Field of Classification Search .............. 250/363.1, 250/361 R, 368, 369.1; 299/95
See application file for complete search history.

(56) References Cited

U.S. PATENT DOCUMENTS

| 4,352,286 | A | * | 10/1982 | Nakatani et al. | ............ 73/23.31 |
| 5,091,716 | A | * | 2/1992 | Nelson et al. | ............... 340/605 |
| 5,528,556 | A | * | 6/1996 | Seeman et al. | ................. 367/25 |
| 5,596,142 | A | * | 1/1997 | Delpuech et al. | ......... 73/152.17 |
| 5,686,674 | A | * | 11/1997 | Lowry et al. | ................ 73/865.8 |
| 5,705,812 | A | * | 1/1998 | Brewer et al. | ................ 250/264 |
| 6,222,192 | B1 | * | 4/2001 | Sekela et al. | ............ 250/361 R |
| 6,781,130 | B2 | * | 8/2004 | Frederick et al. | ........ 250/361 R |
| 6,896,056 | B2 | * | 5/2005 | Mendez et al. | ........... 166/254.2 |

OTHER PUBLICATIONS

Pinnacle Armor—Specialized Products and Services, Blastliet specifications.*
Cizeron et al. "Some results of PMT studies", LHCB Technical Note.*

* cited by examiner

*Primary Examiner*—David P. Porta
*Assistant Examiner*—Marcus H Taningco
(74) *Attorney, Agent, or Firm*—Dickstein Shapiro LLP

(57) ABSTRACT

An armored gamma radiation detector for a solid mineral mining apparatus is provided comprising a scintillation element for detecting radiation emitted from a material to be mined. The radiation detector has a high strength armor assembly surrounding portions of the scintillation element, and a window in the armor assembly is provided adapted to allow gamma rays to reach the scintillation element.

9 Claims, 21 Drawing Sheets

GEOSTEERING OF SOLID MINERAL MINING MACHINES

This application is a continuation of application Ser. No. 10/101,374, filed on Mar. 20, 2002, now U.S. Pat. No. 6,781, 130, which is a continuation-in-part of U.S. application Ser. No. 09/811,781, filed Mar. 20, 2001, now abandoned, which is a continuation-in-part of U.S. application Ser. No. 09/626, 744, filed Jul. 26, 2000, now U.S. Pat. No. 6,465,788, which is continuation-in-part of U.S. application Ser. No. 09/471, 122, filed Dec. 23, 1999, now U.S. Pat. No. 6,435,619, all of which are incorporated by reference herein in their entireties. This application is a continuation of application Ser. No. 10/101,374, filed on Mar. 20, 2002, now U.S. Pat. No. 6,781, 130, which claims the benefit of U.S. provisional application Ser. No. 60/276,896, filed Mar. 20, 2001, now expired.

BACKGROUND

The present invention generally relates to a method and apparatus for detecting the presence of rock during coal or ore mining operations.

A more effective way to control solid mineral mining equipment, or miners, has been greatly desired by the mining industry. Many concepts have already been tried, over a period of many years, to improve mining controls to increase the amount of coal, or other mineral, cut by the mining equipment and to decrease the amount of undesirable rock cut by the mining equipment. Many of these concepts involve "guidance" systems that direct or point the miner where to cut, based on predictions or assumptions related to the location of the mineral-rock interface. These predictions or assumptions are typically based on data or information obtained from the experience of the mining equipment from previous cuts.

One seemingly simplified approach employs repetitive cycles. A computer is instructed by the miner operator to perform specific cycles or the control system is programmed to memorize operator actions over a cycle and duplicate them. This approach does not work well because of the high variability of the rock and mineral formations and operational considerations. This approach is particularly ineffective when applied to continuous miners, because the miner rides on the floor that has been cut resulting in cutting errors (e.g., leaving an excessive layer of coal on the floor, or cutting excessively down into the rock on the floor) for one cut tending to be amplified for subsequent cuts.

In the case of long-wall mining there is some opportunity to utilize what has been learned on one pass along the mineral face to improve upon cutting strategy for the next pass along the face. One approach utilizes a memory system to log the profiles of the rock face at the floor and roof on one pass and then to use this knowledge to influence the cutting as the cutters pass along the same face, going in the opposite direction. This approach has been of only limited success because the rock face profile on one pass does not exactly reflect the needed rock face profile of the next pass and because there is much variability in the formations and mining operations. Consequently, such equipment and operation are limited in their efficiency in cutting to the rock-coal interface using guidance strategy.

Gamma detectors have, over the years, shown promise in detecting the location of the rock-wall interface for both continuous miners and long wall miners, but typically have not been effective because they have been installed so as to measure where the mining equipment has been rather than where the cutter is going. One reason that gamma detectors have often been used in a non-effective manner is that the detectors could not physically survive if subjected to the environment in locations where they would be most effective.

Numerous other approaches have already been conceived and tested over the years for directing or guiding mining equipment. Most of these concepts have not proven to be commercially successful due to technical deficiencies, implementation problems, and cost. Many types of sensors have been incorporated into control systems to monitor the shape, profile and characteristics of the formations through which the mining equipment is cutting and to make cutting decisions on where to point subsequent cuts based on this information. Thus, these approaches fail not only due to practical implementation problems but also because of a fundamental flaw with the concept. Knowledge about the shapes, profiles, or characteristics of the formation being passed through does not provide accurate information about the formation just ahead, for which the cutting decisions must be made.

In most of the examples above, the control systems employed have been complex and expensive. A typical approach is to -use a gravity-referenced or inertial-referenced control system, with various other sensors added. Some of these control concepts have been referred to as "horizon control systems." A horizon control system typically uses the gravity-referenced sensors or inertial-referenced sensors that keep track of the orientation of the continuous miner and the profile of the roof and floor.

In principle, the horizon control system approach is to control the mining equipment by use of guidance systems adapted to mining applications. However, as discussed above, guidance systems cannot generate accurate information about the formation to be cut because the historical information that they log in detail is not a valid indicator of what is ahead. Moreover, these guidance systems are complex and costly.

It is described in co-pending U.S. application Ser. No. 09/811,781 that in underground coal mining, a properly designed and properly positioned, forward-looking armored gamma detector, in combination with a suitable control system, can be effective for reducing the amount of rock taken while extracting an increased amount of coal or other mineral. A mining control system that incorporates such forward-looking detectors is referred to as a "rock avoidance system." The use of rock avoidance systems can help cut the floor of the mine very smoothly and simplify the job of the operator. Rock avoidance systems allow continuous miner operators to be positioned further from the coal face, thus reducing health hazards.

However, even when used with forward-looking rock detectors as described in co-pending U.S. application Ser. No. 09/811,781, these horizon control systems do not utilize the data generated by the rock detectors as fully as it could be used, because the systems are conceived and designed to guide or point, determining the direction to move, rather than being appropriately responsive to sources of external intelligence such as armored gamma detectors. In addition, inertial or gravity referenced systems are not typically designed to provide precision and timely measurements of cutter movements that will allow a rock detector to achieve maximum sensing accuracy.

Rock avoidance systems that rely upon complex guidance systems are costly and, complicated and have some inherent inefficiency resulting from their methodology. A need now exists to provide an accurate rock avoidance system that is simple, economical and easy to install and operate. There is also a need for such a rock avoidance system for use on long-wall mining equipment as well as continuous mining equipment.

SUMMARY

These deficiencies are alleviated to an extent by the present invention which in one aspect provides a rock avoidance system for solid mineral mining using a forward looking rock/mineral interface detector and controlling the miner to cut to the detected rock/mineral interface.

In another aspect, vertical movements of the cutting mechanisms are measured for the purpose of being used by the rock detector to make more accurate mathematical calculations of the location of the coal-rock interface.

In another aspect, a method is provided for improving accuracy by incorporating a device within an armored rock detector to sense angular movements of the cutter boom and to correlate changes in gamma radiation to the angular movements, within selected energy ranges. An armored rock detector, so configured, can make effectively accurate cutting decisions under a wide range of mining conditions without support from complex control systems. Cutting decisions from the rock detector are transmitted directly to the miner control system to slow or stop the movement of the cutter toward the coal-rock interface or to a control and display panel where other constraints and logic may be applied.

In another aspect, the change in attenuation is determined, and the thickness of the remaining coal is calculated by measuring the rate at which the gamma radiation increases. Greater accuracy in the calculations is achieved by measuring the relative changes in gamma counts for various energy levels. Quick response is achieved so that the cutter of a continuous miner moving toward the rock on each cut may be stopped before reaching the rock by employing curve-fitting techniques that correlate the gamma ray measurements with incremental movements of the cutters. The rock detector is outfitted with the required logic elements and algorithms.

In yet another aspect, a method of geosteering is provided on a continuous miner is for a shearing down to be slowed slightly as the floor is approached. Control of the shearing is accomplished by signals from the rock detector which operate the solenoids that control the hydraulic system. Following the shearing stroke, the miner is placed in reverse for a short distance in order to remove the small cusp left behind the cutter. During this backing up, the rock detector will maintain the boom at constant angle so that the floor will be cut level. Next, the operator moves the miner forward slowly, simultaneously shearing up, to sump to approximately fifty percent the diameter of the cutter. If a rock detector is used at the roof, it will slow the cut slightly before reaching the rock interface and then stop the cut. While the boom is being held at a constant angle by the rock detector, the operator drives the miner forward to a fill sump. At this point, the operator is ready to start the shear down to repeat the cycle.

In another aspect, the rock detector is placed near the cutter on a continuous miner, so that it can detect the radiation passing through the coal in front of the advancing cutter. When cutting at the floor, the detector moves with the advancing cutter such that the angular size of the field of view is not reduced as the cutter moves down toward the bottom portions of the miner.

In another aspect, the rock detector is placed near the cutter on a long-wall miner When geosteering the trailing drum, the divergence rock detector is positioned within a few feet of the bottom edge of the picks so that a divergence between the tips of the picks and the rock will be detected before coal is left unmined. Also, the divergence rock detector is positioned close to the picks so that the cutter can be biased toward divergence without concern for leaving coal unmined. In another aspect, a convergence rock detector is used on the trailing drum, and positioned close enough to the cutter to be able to detect rock that is being mined and then mixed with the coal. In a preferred embodiment a geosteering system is provided that includes an armored rock detector, positioned on the boom of a continuous miner to view the area where coal is being cut, to measure the changes in gamma radiation as a result of the coal being cut away, to correlate the changes in gamma radiation with incremental changes in the position of the cutter, and to make logical decisions when to slow and/or to stop the cutter before cutting into the rock. In order to obtain precise measurements of rotation of the cutter boom or of the vertical movements of the cutter, an accelerometer is incorporated into the rock detector.

In another preferred embodiment, the geosteering system includes a control and display panel that keeps the operator informed about the cutting progress, particularly in regard to cutting at the roof. This panel accepts data and decisions from the rock detectors and also displays the position of the cutter relative to the most recent cuts at the floor. A solid-state accelerometer, in the form of a micro-chip, is included as part of the electronics. This accelerometer acquires additional information on the instantaneous motion of the continuous miner and sends that information to the rock detector so that the rock detector can subtract errors resulting from motion of the miner from the measured incremental movement of the cutter and rock detector. In a typical application, gamma data is correlated to the incremental movements of the cutter and this information is retained within the control and display panel for at least ten cutting cycles. Detailed, automatic analysis of this data allows refinement of the logical decisions to be made for future cutting cycles.

In another embodiment, an encoder and/or a potentiometer are provided to instantly measure and report to the rock detector, the movement of the boom, on which the cutter is attached. Such substantially instant, precise data allows the rock detector to make fast, accurate measurements. When rock detectors are being used for controlling cutting at the roof, in addition to controlling cutting at the floor, such auxiliary devices provide supporting information to the rock detector, to the miner control system, and to the operator. This preferred embodiment includes a cutter motion indicator, containing an optical encoder and a potentiometer, at the pivot point of the boom. By combining this precise, high-speed data with the expanded computational capabilities of other preferred embodiments, advanced automation at higher speeds of operation are made possible.

In yet another embodiment, rock detectors are used to steer the cutting of a long-wall mining system. In some applications, both the leading drum and the trailing drum of a long-wall shearing system are geo-steered by use of rock detectors. Whenever the mining equipment reverses direction, the leading drum becomes the trailing drum. The armored rock detector is placed near the bottom of the cowl for the trailing drum and allows direct view of the surface being cut by the drum. The rock detector begins by slowly raising the drum until the rock detector determines that coal is being left unmined. Raising and lowering of the drum by the rock detector is accomplished by operating the solenoids that control the hydraulic system. Upon recognition that a small amount of coal is being left over the rock, the rock detector quickly lowers the drum by approximately two inches. The amount that the drum is lowered will depend upon the miner and mining conditions. In one aspect, the rock detector continues to steer the drum so that the cutting operation cycles between three conditions (1) removal of only a small amount of rock, (2) preferable removal of all coal and no rock, and (3) leaving up to one or two inches of coal over the rock. In the case where the coal bonds well to the rock, typically fire clay, the maximum amount of coal occasionally left will preferably be less than two inches. The preferable result is that for most of the cut along the face, almost no floor rock is mined and very little coal is left unmined. For the case where soft coal is not bonded to the fire clay, preferably substantially all of the coal will be removed substantially all of the time.

These and other objects, features and advantages of the invention will be more clearly understood from the following detailed description and drawings of preferred embodiments of the present invention.

BRIEF DESCRIPTION OF THE DRAWINGS

FIG. 16b is a cross-sectional view of the cutter motion indicator of FIG. 16a.

FIG. 17 is a cross-sectional view of a linkage mechanism used with cutter motion indicator of FIG. 16a.

DETAILED DESCRIPTION OF PREFERRED EMBODIMENTS

Figure 1:
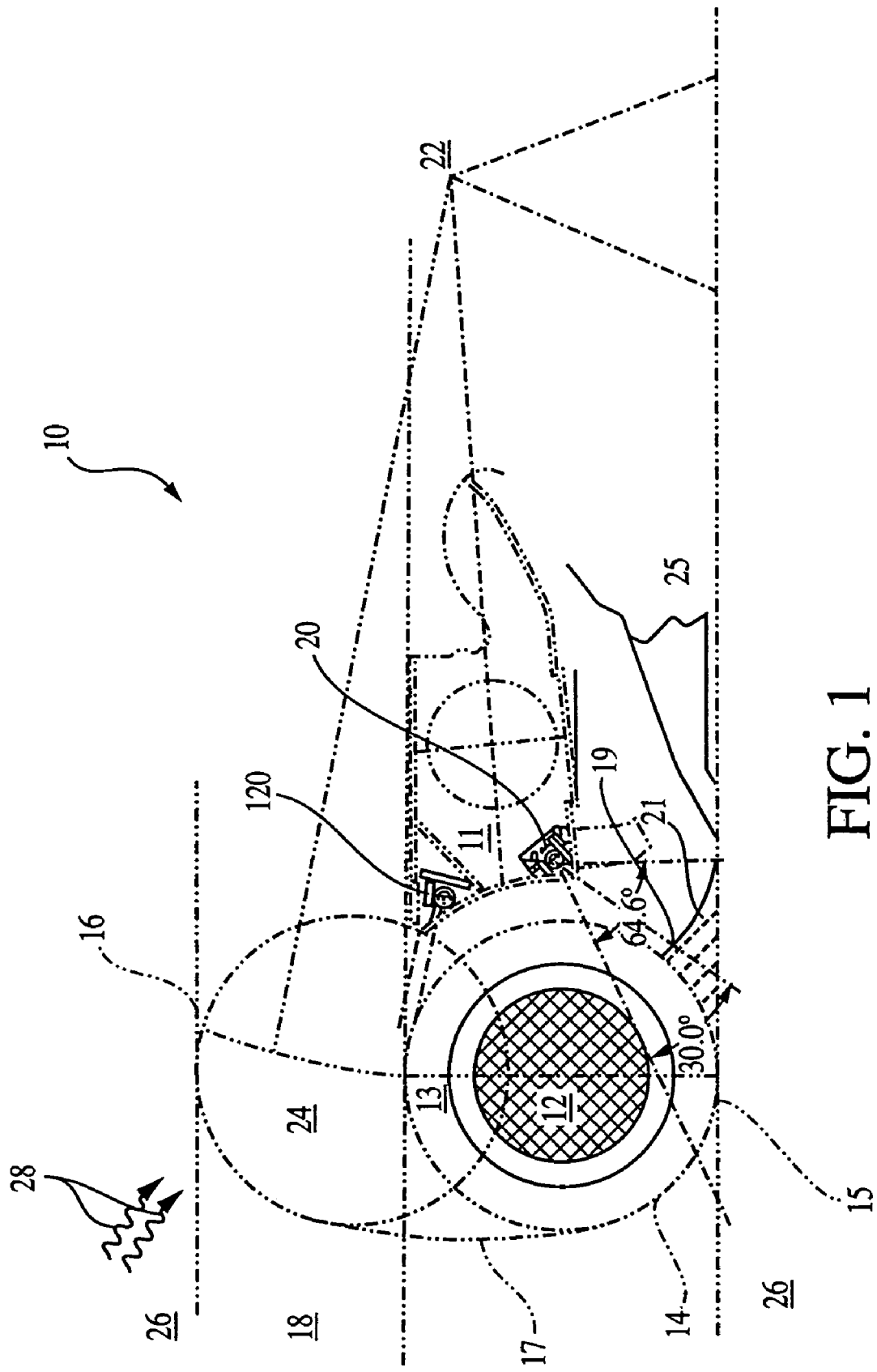
FIG. 1 is a schematic view of a continuous miner including a pair of rock detectors constructed in accordance with a preferred embodiment of the invention.

The present invention provides a more accurate and faster solid mineral mining by use of a rock avoidance system that applies a new methodology called geosteering to solid mineral mining.

Geosteering techniques have been used in oilfield applications as exemplified in U.S. Pat. No. 5,230,386, RE 035,386, and U.S. Pat. No. 5,812,068. With geosteering, the distance to the oilfield bed boundary is measured while in the formation, and the drill string is steered by direct measurements of the formation so that it stays in the mineral vein. This technology has advanced to the point where horizontal wells in excess of one mile are routinely drilled. Further, these wells can now be drilled with the drill string staying in the reservoir formation throughout the horizontal section. Such geosteering for oilfield applications was recognized as an important new methodology and a substantial advance over directional drilling techniques exemplified by U.S. Pat. Nos. 3,982,431 and 4,905,774.

The "directional drilling" approach to horizontal drilling in oil and gas wells is somewhat analogous to currently-used "horizon control" that has been used for mining applications. In both cases of directional-based controls, for oil and for coal, independent attitudinal and/or inertial reference systems provide the basis for guiding or pointing the machinery. In each application, the extent and profile of a solid mineral vein to be mined is not predictable. Indeed, the problem is more critical in coal mining than in oil well drilling, because the mining operation needs to be accurate to within inches compared to the accuracy of feet typically required in oil wells.

Guidance or pointing based on an inertial or gravity based reference system does not provide the intelligence needed to accurately make the next cut. The control functions at any moment must be accomplished by signals from sensors that are measuring relevant parameters for the formation just ahead, where the cutting will occur. Directional control systems, such as horizon control, used in solid mineral mining have not produced the successes achieved with directional drilling in horizontal oil wells. Thus, implementation of geosteering to solid mineral mining represents an even greater opportunity for improvement than did the implementation of geosteering for drilling oil and gas wells.

The principle of geosteering for continuous miners is to keep the cutter moving between the boundaries of the coal vein and letting the continuous miner follow the cutter through the geologic formation. Geosteering is more straightforward than conventional approaches, and is fundamentally simpler in concept. The actual profile of the tunnel being cut through the earth during mining, the vertical excursions of the tunnel, and the slope of the floor and roof of the tunnel are not primary the primary objective of geosteering. These parameters can be derived from data acquired while performing geosteering, and may be of some interest, but such data are the consequence of geosteering rather than being the guide for cutting.

Coal is located in a formation between other materials, generally classified as rock. An example would be a coal seam having black marine shale at the roof and fire clay, another form of shale, at the floor. In this example, the shale has a significantly higher level of natural radiation than the coal. As the shale radiation passes through the coal from the rock, it is attenuated. The thickness of the coal is reduced as a continuous miner removes the coal. Reduction in the thickness of the coal results in less attenuation so that the gamma radiation reaching the detector increases as the coal is cut away. At the point of contact between the cutter and the rock, there is no attenuation by coal and the gamma radiation is at a maximum. By measuring the rate at which the gamma radiation increases, the change in attenuation can be determined, and the thickness of the remaining coal can be calculated.

Greater accuracy in the calculations is achieved by measuring the relative changes in gamma counts for various energy levels. Quick response is required because the cutter of a continuous miner is moving rapidly toward the rock on each cut and should be stopped before reaching the rock. Since the cutter picks are on a rotating drum, the advancing face of the cutter is a curve. As the first picks along the centerline of the drum begin to enter the rock, bare rock is exposed and pieces of rock are cut away and dragged on top of the coal pile behind the cutter. If the cutters actually enter the rock, it is desirable to immediately stop the advance of the cutter to save wear on the picks and avoid cutting undesirable rock. To achieve faster response and higher accuracy, curve-fitting techniques are employed by correlating the gamma measurements with incremental movements of the cutters. The system includes associated logic elements and algorithms.

Geosteering, which relies primarily upon measurements of natural gamma radiation, can only be properly implemented by understanding the physics of the processes and physical phenomena involved in making and interpreting the gamma measurements. Physical characteristics of the formations and their radiation properties are reviewed below. The logic elements included in the preferred embodiments have been created to accomplish the required decision-making, taking advantage of this understanding of the physics involved, within the confines of the protected environment provided within the rock detector.

Radiation flux from coal/rock usually originates from trace levels of radioactive potassium, uranium, or thorium that are within the rock. In a typical case, a discrete spectrum of gamma rays is produced by the radioactive decay of the trace elements. These gamma rays are transported through the formation, losing energy through Compton scattering (and possibly pair production), until they are finally photo-electrically absorbed. Within the rock, an equilibrium spectrum is soon established reflecting a balance between the production of gamma rays in radioactive decays, the downscattering of gamma rays to lower energy, and the absorption of gamma rays through photoelectric absorption.

When the flux enters the coal region, this equilibrium is upset. The production of gamma rays in coal is much lower, reflecting a significantly lower level of potassium, uranium, and thorium. Since the higher energy regions of the radiation flux are not replenished, the spectrum shifts to lower energies as the gamma rays are down-scattered and decreases in magnitude as the gamma rays are absorbed.

The inverse of this process is observed as coal is mined. First, the gamma flux is low in magnitude and energy, reflecting the extensive absorption by the thick layer of coal. Then, as coal is removed, the magnitude of the flux increases, and the mean energy of the flux increases.

Figure 2:
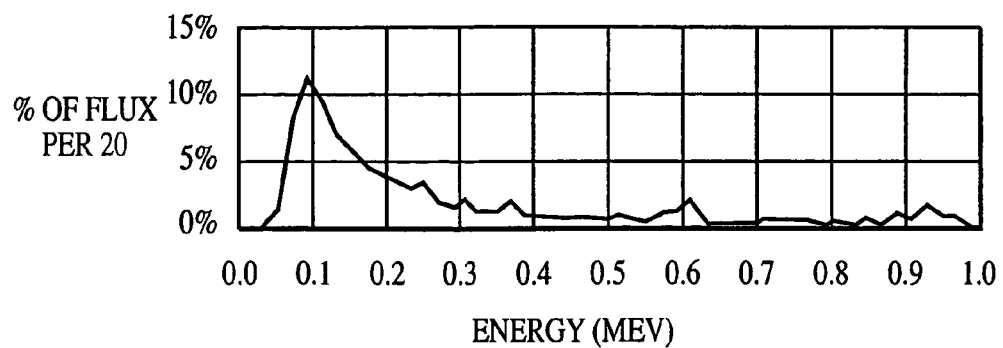
FIG. 2 is a graph showing a typical equilibrium energy spectrum for a homogenous rock formation above and below a coal vein.

A typical equilibrium spectrum for a homogeneous rock formation above and below a coal vein is shown in FIG. 2. The broad peak at about 100 kev is the down-scatter peak. Most of the gamma radiation under this peak has lost energy through Compton scattering. If Compton scattering were the only physical process involved, a $1/E^2$ distribution would be seen, instead of the down-scatter peak. However, as gamma rays lose energy, their cross-section for photoelectric absorption increases. This absorption results in the gamma radiation having the lower energy, producing the backscatter peak that is observed in FIG. 2.

The formula for the photoelectric cross-section is given as:

$$P_e = 0.01 \text{ barnes/electron } \frac{\left(\frac{Z}{10}\right)^{3.6}}{\left(\frac{E}{132 \text{ kev}}\right)^{3.15}} \quad \text{Eq. 1}$$

where Z is the average atomic number of the formation. The denominator in this formula shows the strong energy dependence of the cross-section, and explains the existence of the backscatter peak. The numerator gives the dependence of the cross-section on the lithology of the formation.

An oilfield convention for describing this dependence is to consider the photoelectric cross section at E=30.6 kev. At this energy, the numerator=0.01 and we have:

$$Pe = \left(\frac{Z}{10}\right)^{3.6} \text{ barnes/electron} \quad \text{Eq. 2}$$

Using this convention, the photoelectric cross-section of coal is found to range from about 0.1 to about 0.3 barnes/electron, while the rock above and below the coal typically ranges from 2-5 barnes/electron. As a result, of this difference in the photoelectric cross-section, the down-scatter peak for the rock above and below the coal is at a higher energy than the down-scatter peak for coal.

It is somewhat easier to visualize these parameters by starting with only rock and adding coal on top of the rock, as happens when steering the trailing shearing drum of a longwall miner. If the drum is raised, a thin layer of coal is added on top of the rock and the spectrum is shifted to lower energies. Gamma rays from the rock lose energy as they are Compton-scattered in the coal. The higher energy regions of the flux are not replenished, because the natural radioactivity of the coal is much lower than that of the rock. As more coal is added, the gamma rays are shifted to sufficiently low energies to allow absorption to be a significant factor again. The reverse of this description then applies to the removal of coal by the cutters on a continuous miner.

Figure 3:
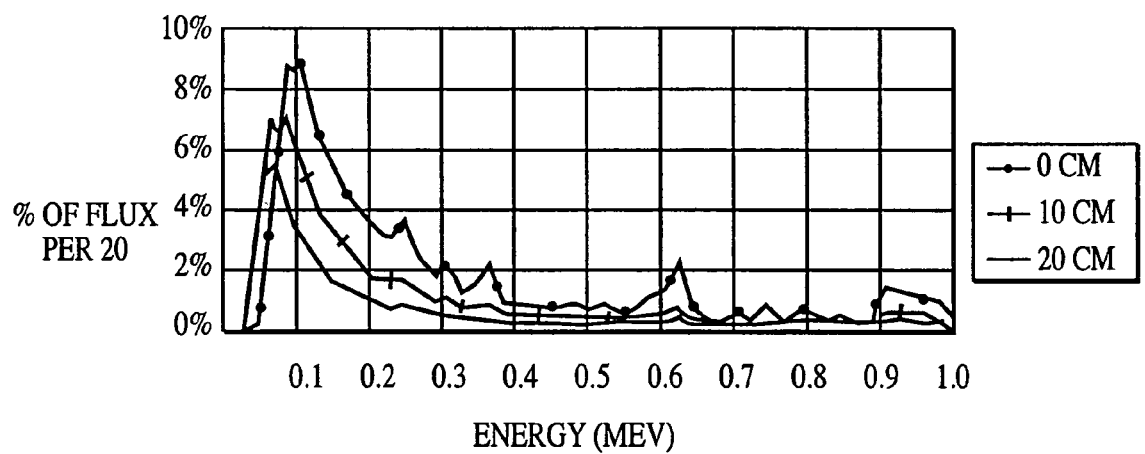
FIG. 3 is a graph showing the effects of coal on a typical equilibrium energy spectrum for a homogenous rock formation.

FIG. 3 shows an example of this phenomenon, presenting the spectrum at the surface of bare rock (0 cm) and at the surface of a coal layer on top of that rock at distances of 10 cm and 20 cm from that rock. From the plots on FIG. 3, it is clear that the percent of flux per energy unit is greater at the rock face than that observed through a layer of coal.

Geosteering accomplishes the steering for solid mineral mining through direct measurements made on the formation in the region where the cutting is being performed. Inertial reference systems, attitudinal reference systems or guidance systems are not required for geosteering. The steering is accomplished using rock detectors that follow the mineral formation.

In conventional systems, the vertical movements of the cutter are controlled to be in conformance to a complex profile of the movements and/or attitudinal parameters of the continuous miner and of the tunnel through which it is moving. Conventional systems have been arranged primarily to track where the miner has been, and then attempts to adjust the direction and actions, and point the cutter based on what is learned during cutting. Geosteering, in contrast, simply follows the mineral vein within the formation.

Figure 20:
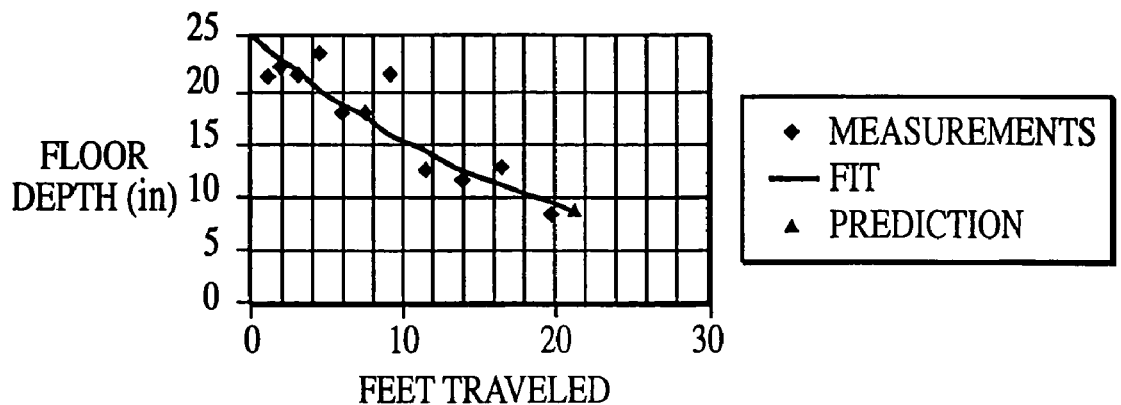
FIG. 20 is a graph of predicted and measured floor depth versus distance traveled.
Figure 21:
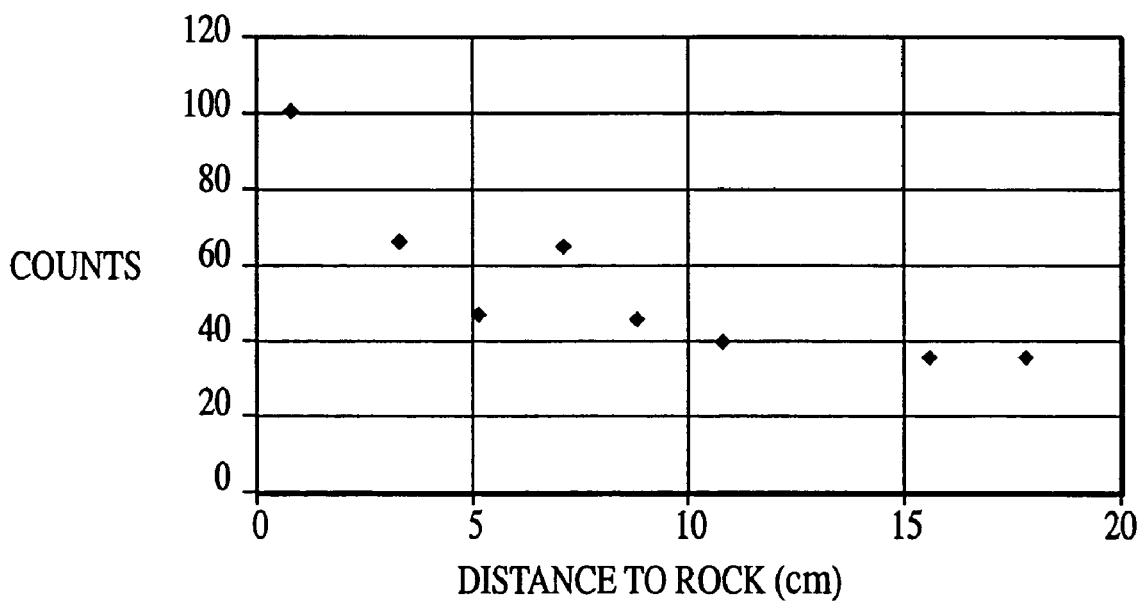
FIG. 21 is a graph of detected gamma ray counts versus coal/rock interface depth.

Another preferred embodiment includes increasing the computational capabilities within the rock detector so as to be able to perform more complex calculations for making better cutting decisions. Statistical analyses are performed to determine the probable accuracy of the decisions made by the rock detector. Data from this expanded capability supports higher level analyses. This is depicted in FIG. 20. FIG. 20 shows the estimates of the position of the coal/rock interface at the floor for previous cutting cycles, as well as predictions for the next cutting cycle. This prediction is used as the "0" reference for the next measured cycle. The position of the regular measurement of the counts is given in terms of the distance to the predicted coal/rock interface. A typical measurement is depicted in FIG. 21. It shows the counts measured in a time interval of 0.25 seconds as a function of depth. (This time interval is not unique but is given as a typical example.) When these data points are analyzed, the predicted rock interface is at −1.67 inches, not 0.0 inches. However, that is not an error. To illustrate the ability of this technique to pick out changes in slope, the model formation incorporated a change in slope at 275 inches, which resulted in the coal/rock interface being 1.5 inches lower than predicted. The measured data were sufficient to determine this change.

This measurement will be added to the earlier measurements, the expanded set of measurements will be fitted, and a prediction will be made for the next cut. Also, the measurement can be used to extend the present cut to the newly measured boundary. Immediate use within a pass requires quick decision-making during the sweep down, since an entire sweep down can occur in just two or three seconds. The processing capability described in this invention (including PICs and a DSP) have the speed and capability needed to determine the boundary in sufficient time to affect the cut.

Another feature that should be noted is the ability of such a system to "learn" from previously obtained data. An example of this would be the observed count rates as a function of the distance to the interface. As long as the radiation from the rock above and below the coal is constant, and the thickness of the coal vein is constant, this function will remain the same. But, as these variables change, so will the function.

Typically, these changes occurs at a much slower rate than the change in the position of the floor. Thus, over the interval used to predict the next floor position, the response function can be assumed to be a constant. But, over longer periods, a change in this function can be noted. Generally, it can be assumed to be constant over about ten to fifteen mining passes, which should be sufficient to determine the position of the boundary at the next cut. But, over longer intervals, such as a day of making cuts, the coal thickness and or the level of radioactivity in the rock above and below the coal can vary.

The change in the response pattern produces a signal that can be distinguished from the signal produced by changes in the position of the coal/rock interface. There are two ways in which this difference can be observed. First, the ratio of the count rates in various energy regions changes with the distance to the boundary. An increase in the level of radioactivity will have minimal effect on this ratio. Second, there is a unique signature when the miner breaks through the coal/rock interface and start mining into the rock. This signature will be considered in some detail in the next example.

When a change in the thickness of the coal, or the level of radioactivity in the formation above or below the coal crosses a threshold of significance, the system is capable of performing two actions. First, it can alert the person supervising the mining activities of the change in the conditions. This is done through the use of the control and display panel. This affords him the opportunity to manually change the actions of the miner. Second, it can alter the pattern it uses to determine the interface to reflect the new conditions.

Figure 22:
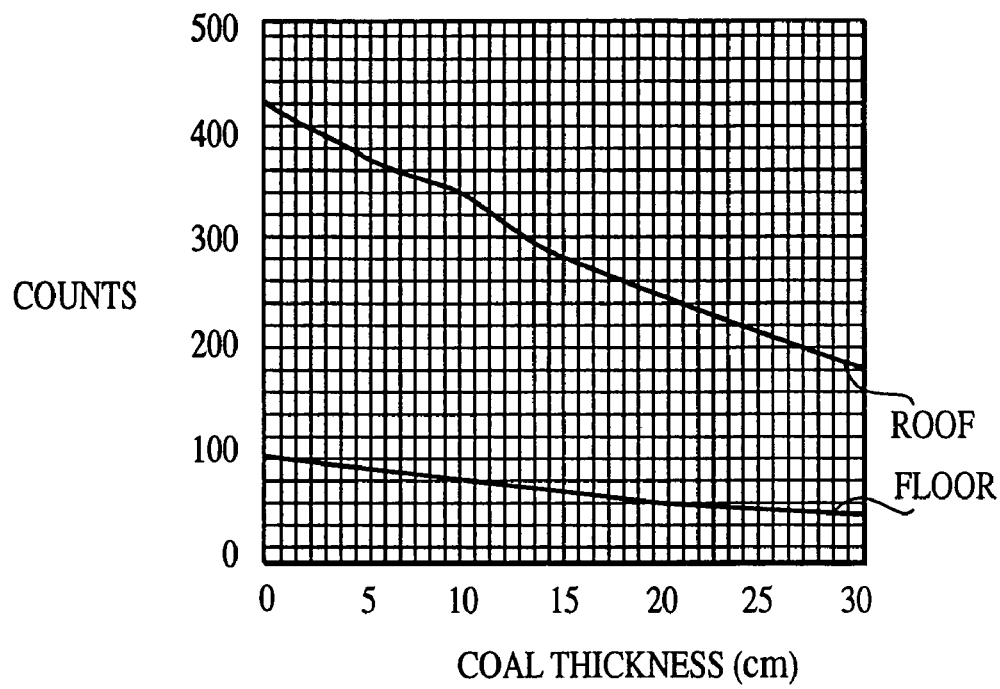
FIG. 22 is a graph like FIG. 21.

Another preferred embodiment involves a system with two detectors: one for the roof and one for the floor. An example is pictured in FIG. 1. In this example, the roof rock is five times as hot as the floor rock. Examples of the relative signals for the roof and the floor are shown in FIG. 22, which gives the count rate as a function of the distance from the miner to the floor.

The response of the floor detector is much flatter than the response of the roof detector, as well as much flatter than the floor detector response in the prior example. This is a result of the heightened background cause by the roof being five times as radioactive as the floor.

Even with shielding, the floor detector still has some sensitivity to the radiation from the roof. When, as in the prior example, the roof radiation is comparable to the floor radiation, the effects of this sensitivity are relatively small. But, when the roof is five times as hot as the floor, the effects become noticeable.

Note that the background radiation level from the roof is not a constant. As the process of mining down towards the floor rock begins, the boom containing the cutter and the armored rock detectors is typically level or tilted slightly upwards. As the mining progresses, it tilts down towards the floor. With this motion, there is maximum sensitivity to the roof radiation at the start of the process, and a reduction in sensitivity as the miner tilts toward the floor. This results in a decrease in the count rates due to the roof radiation, which partially offsets the increase in the count rate that result from the removal of coal from the floor and the flattened response seen in FIGS. 22-23.

This reduction in signal combined with an increase in the statistical uncertainty due to the higher background from the roof results in significantly greater uncertainty in determining the floor coal/rock interface from measurements made while cutting coal than from establishing the roof coal/rock interface from measurements made while cutting coal. Given this difference, one might think that the floor detector will not add to the accuracy of the measurement.

Figure 23:
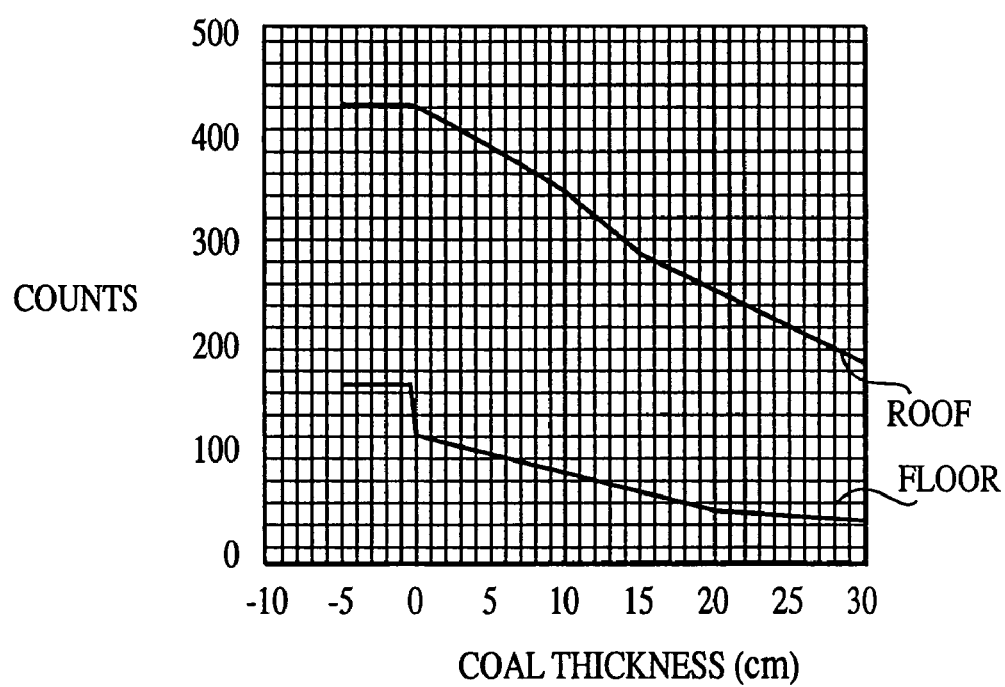
FIG. 23 is a graph like FIG. 21.

There is, however, a very significant bed boundary signal that is unique to the floor detector. It is a significant rise in the count rate as the miner reaches the floor. An example of this is shown in FIG. 23, which shows a step function change in count rate at the coal/rock interface.

The reason for this change is that, when the miner reaches the boundary, it starts mining the radioactive rock instead of the coal. The surface of the coal pile is quickly covered with shale. Since the coal pile is very close to the detector, the higher radiation from this region results in a significant increase in the detector count rate.

A similar signal is not seen at the roof. When the miner breaks through the coal/rock interface at the roof, the shale falls to the floor. The roof armored rock detector is shielded from the floor signal, so it does not show a marked increase right at the boundary.

Armored rock detectors may be used for geosteering at the floor and at the roof of a mining operation. FIG. 1 shows a continuous miner 10 that has been configured with two armored rock detectors 20, 120. The primary function of these detectors 20, 120 is to determine when the cutter picks 14 are approaching the coal-rock interface 15, 16, to slow the movement of the boom 11, and to stop the movement of the boom 11 whenever all of the coal 18 has been removed.

Space for installing a gamma detector on a continuous miner is very limited since the detector must be positioned in a specific location in order to be in view of the coal to rock interface. The presence of armor, which is required to protect the detector, further limits the available space. An explosion-proof housing takes up even more of the available space, and often results in reducing the diameter of the photomultiplier tube. As the diameter of the photomultiplier tube is reduced, the efficient transfer of light to the tube becomes more critical. The dynamic support system for the scintillation element 110 preferably should be effective for a sodium iodide (NaI) crystal having a high length to diameter ratio since NaI crystals are easily fractured by vibration, shock, shear or bending forces.

Mine safety requirements dictate that electrical and electronic equipment be housed in enclosures that are explosion-proof in order to prevent ignition of dust or gas that may be around the detector. One unique feature of the illustrated embodiment is that the detectors 20, 120 are configured so that the explosion-proof requirement is met at the detector. Having the explosion-proof housing 59 at the detector allows the electronics to be at the detector so that the sensitive, low level signals do not have to be transmitted outside the protective structures to electronics which have been located at some distance away, often many feet. All this has been achieved in such a way so as to not require a large space, the small volume making it possible for the detector to be strategically placed near the target stratum. Explosion-proof boxes typically used to protect electrical systems on miners are so large that they generally do not survive in those locations.

Each of these detectors 20, 120 has been strategically positioned to allow it to receive gamma radiation from the rocks at the coal-rock interface 15, 16 in front of the advancing cutter picks 14, as well as directly behind the cutters. To reach the rock detectors 20, 120, some of the radiation 28 passes between the picks 14. In the event that the cutter picks 14 overshoot the interface 15 at the floor, and enter the floor rock 26, the picks will throw rock on top of the coal pile 21 behind the cutter. This sudden exposure of the rock surface and the loose rock added on top of the coal pile 21 behind the cutter gives an immediate rise in gamma counts, an indication that the cutter 12 has gone too far and the shearing is stopped before a significant amount of rock 26 is removed. By making the rock detectors 20, 120 faster and more accurate, the cutter 12 can be stopped before cutting into the coal-rock interface 15. A variety of techniques are employed to increase the accuracy and speed of the detectors 20, 120.

Figure 4:
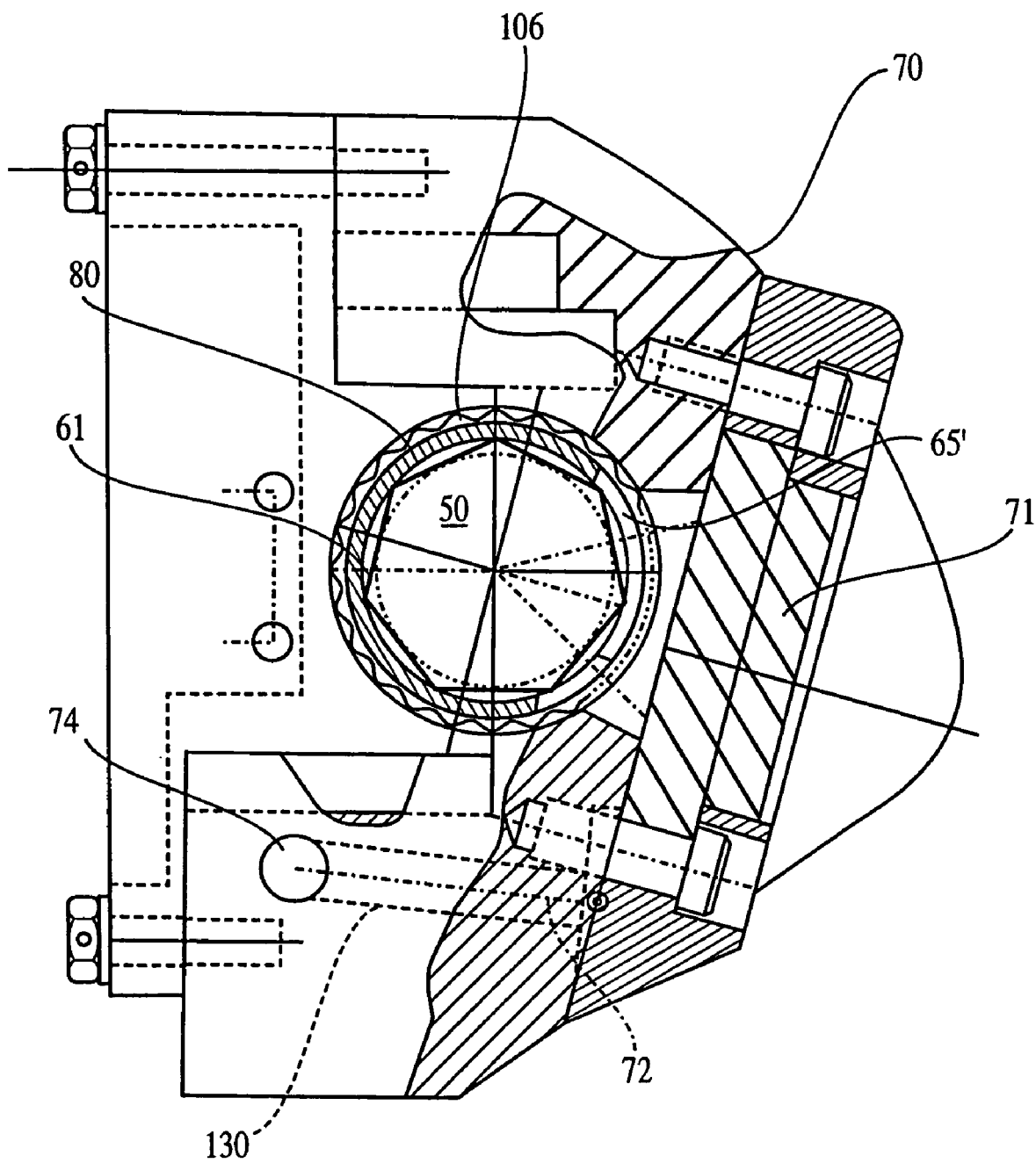
FIG. 4 is a partial cross-sectional view of one of the armored rock detectors of FIG. 1.
Figure 5:
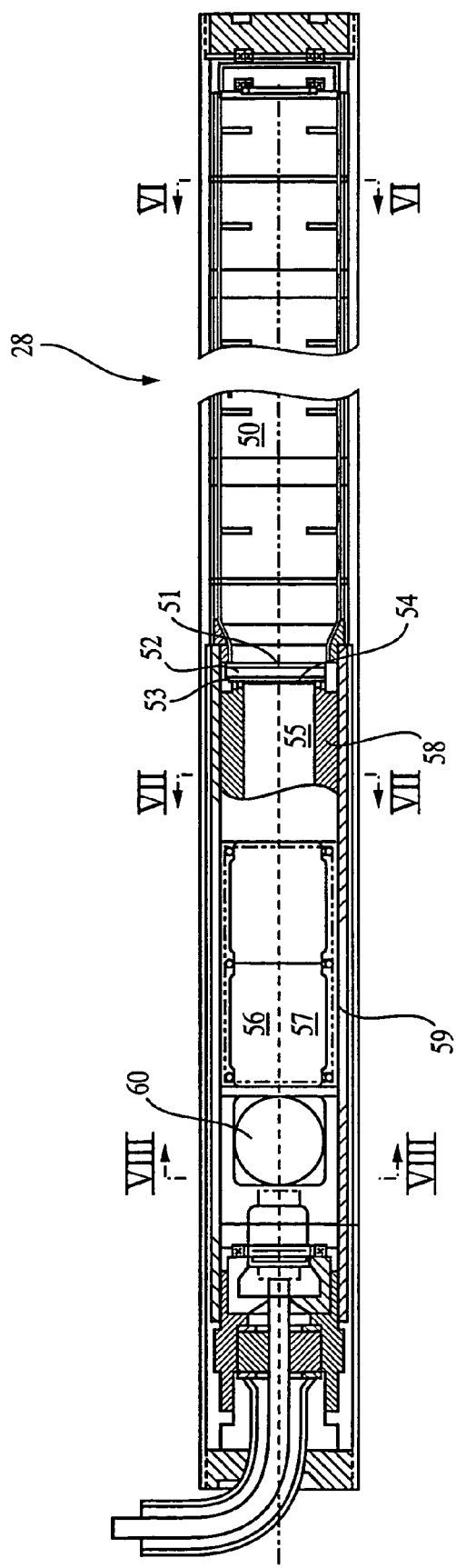
FIG. 5 is a cross-sectional view of one of the rock detectors of FIG. 4.
Figure 6:
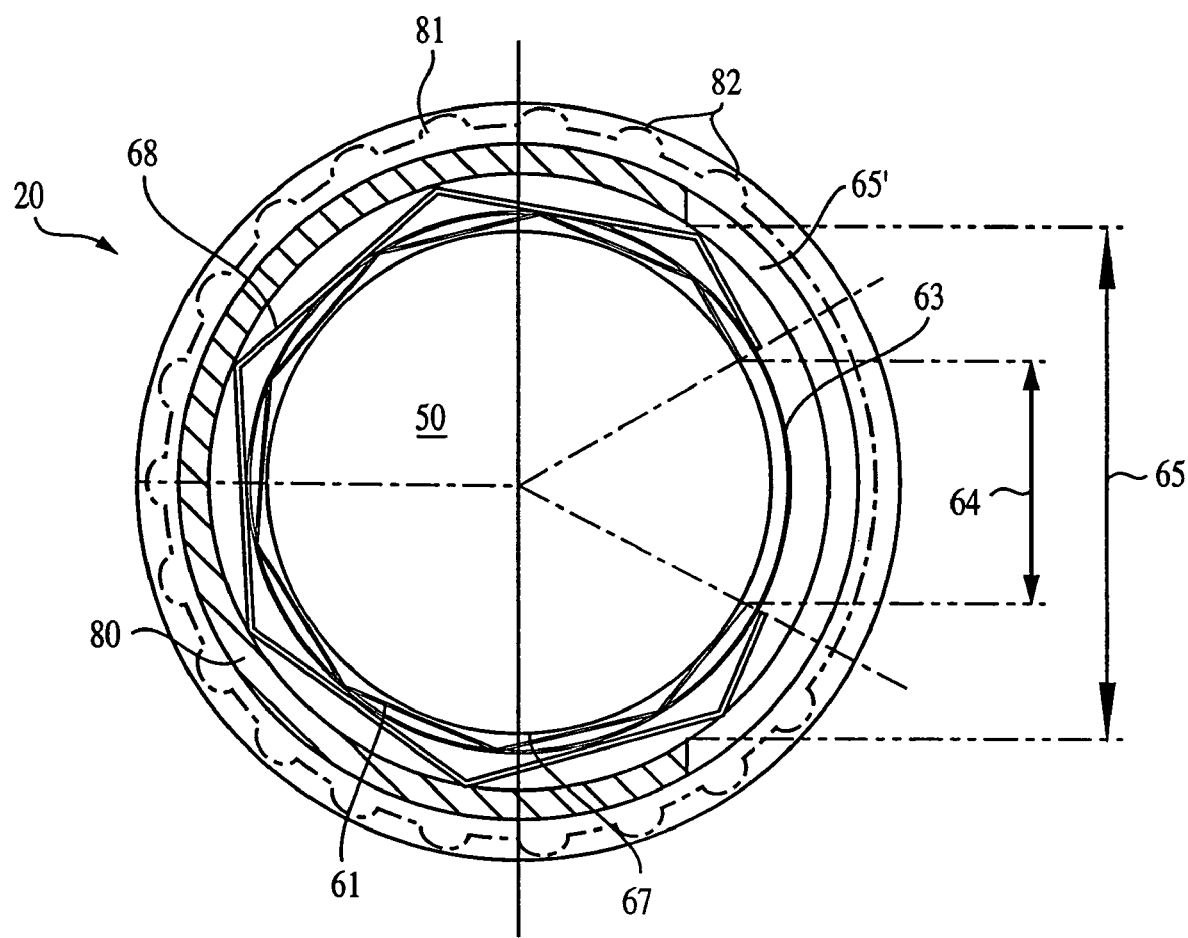
FIG. 6 is a view taken along section line VI-VI of FIG. 5, at the scintillation element.
Figure 7:
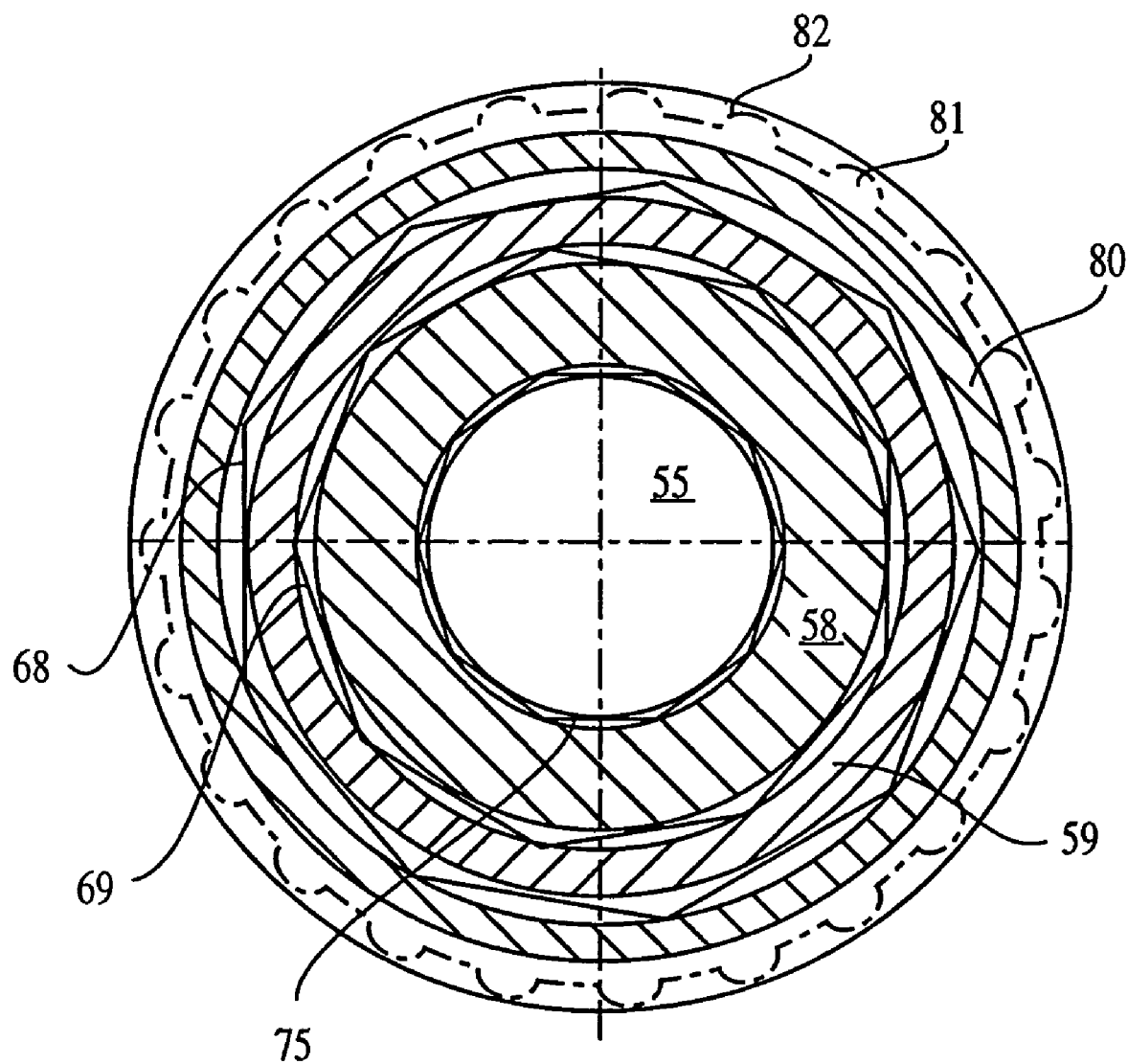
FIG. 7 is a view taken along section line VII-VII of FIG. 5, at the photo-multiplier tube.
Figure 8:
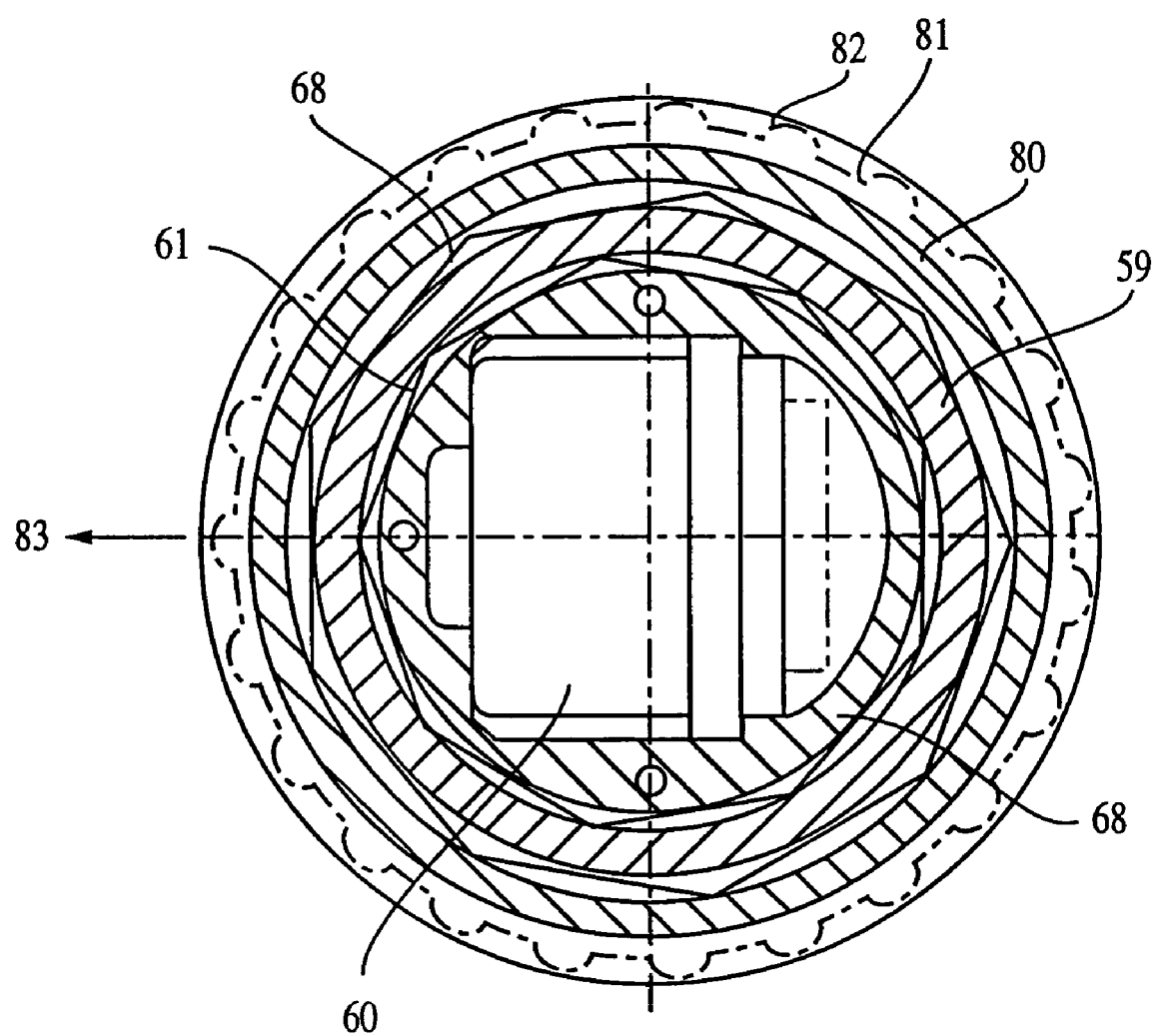
FIG. 8 is a view taken along section line VIII-VIII of FIG. 5, at the accelerometer.

Many functional elements are required to make effective the rock detectors 20, 120. As can be seen in FIGS. 1 and 4, the rock detectors 20, 120 are protected by armor 70 that surrounds, shields, and supports them at a critical location near the cutter picks 14. A challenge in designing the armored rock detector 20, 120 is the simultaneous provision of effective protection from the harsh environment and of an unobstructed path for the gamma rays 28 to enter the scintillation element 50 with as little attenuation as possible. Windows are provided in each portion of the structure to prevent obstruction of the gamma rays 28 trying to enter the scintillation element 50. FIGS. 6-8, which are cross-sectional views of FIG. 5, show the various elements that protect the scintillation element 50, the electronics 57 and other sensors. These multiple levels of protection are described in detail below.

Any structure protruding from the surface of the boom likely will be broken off due to the impacts from the thrown materials. Thus, the armored detector assembly is formed of a material capable of being welded to the mining equipment. Preferably, part or all of the armored detector assembly is made from a high strength material, such as case hardened steel or a high strength steel alloy, that is adapted to highly attenuate gamma radiation. Further, the armored detector assembly is affixed to the boom such that it is flush with the surface of the boom. The dynamic support system for the scintillation element 50 preferably should be effective for a sodium iodide (NaI) crystal having a high length to diameter ratio since NaI crystals are easily fractured by vibration, shock, shear or bending forces.

Gamma rays 28 entering the armored rock detector 20, 120, shown in FIG. 4, pass through a non-metallic window 71, preferably formed of poly-ether, ether, ketone (PEEK), in order to reach the scintillation element 50 within the rock detector 20, 120. Other windows 65 have been cut into a rigid dynamic enclosure 80 which surrounds the scintillation element 50. A gap 65' is provided in a flexible support sleeve 68 within the rigid dynamic enclosure 80 and a gap 64 is provided in the flexible support sleeve 61 surrounding the scintillation element 50, inside the scintillation shield 63. The gaps 65', 64 are aligned to minimize the amount of metal in the path of the gamma rays 28, except for the scintillation shield 63, which has been made as thin as possible.

Next, with reference to FIG. 5, will be described the general functioning of the detectors 20, 120. A scintillation element 50 responds to gamma rays 28 that have been emitted from the rock 26 above or below the unmined coal 18. The response is to produce a tiny pulse of light that travels to a window 52 at the window end of the scintillation element 50 or is reflected into the window 52 by a reflector 67 (FIG. 6) that is wrapped around the scintillation element 50. The light pulse travels through an optical coupler 51, through the window 52, and through a second optical coupler 53 into the faceplate of a light detecting element, shown here as a photomultiplier tube 55. An electrical pulse is generated by the photo-multiplier tube 55 and sent to electronics element 57. The photo-multiplier tube 55, the electronics element 57 and an accelerometer 60 are located in an assembly called a photo-metric module 58. Since components within the photo-metric module 58 utilize electricity, it is necessary that it be enclosed in an explosion-proof housing 59 to avoid accidental ignition of gas or dust that may be in the vicinity of the continuous miner 10 on which the armored rock detector 20, 120 is installed. In addition to satisfying the explosion-proof safety requirements of the Mine Safety and Health Administration, the explosion-proof housing 59 also serves as an effective barrier that protects the electrical elements 56, 57 and the accelerometer 60 from the strong electromagnetic fields generated by the heavy electrical equipment on the miner 10.

Better details of the protective elements are shown in FIGS. 6-8. The first view in FIG. 6 shows a flexible support sleeve 61 surrounding the scintillation element 50, which protects it from high levels of lower frequency vibrations. The tight fitting sleeve 61 firmly and uniformly supports the fragile scintillation element 50 at flat portions 63 of the sleeve 61 and provides a high resonant frequency so that it will not resonate with lower frequency vibrations that pass through the outer support system. The outer support system consists of the flexible support sleeve 68 inside of the rigid enclosure 80 and a rigid elastomeric shock absorbing sheath 81 which surrounds the enclosure 80. A typical size scintillation element 50 for this application is 1.4 inches in diameter by 10 inches in length, but may be as large as 2 inches in diameter. The resonant frequency of these outer support elements 68, 81, 80 protect against shock and isolate the scintillation element 50 from high frequencies.

FIG. 7 illustrates a view of the photo-multiplier tube 55, which is inside the photo-metric module 58, which in turn is within the explosion-proof housing 59. A flexible support sleeve 75 surrounds the photo-multiplier tube 55, another flexible sleeve 69 surrounds the photo-metric module 58, and the flexible sleeve 68 extends the fill length of the rigid dynamic enclosure 80 over the explosion-proof housing 59. Likewise, the elastomeric shock-absorbing sheath 81 fully covers the entire rigid dynamic enclosure 80. It should be noted that this sheath 81 serves other useful purposes. It provides good mechanical compliance with the armor 70. This is particularly important during installation in which dust and particles will be present. Another purpose of the sheath 81 is to prevent water or dust from entering through the window in the enclosure 80.

FIG. 8 illustrates the accelerometer module 60, which is afforded the same critical protection from the harsh environment as the photo-multiplier tube 55. Installation of the rock detector 20, 120 into the armor 70 includes rotating the detector so that an axis of sensitivity 83 of the accelerometer 60 is approximately parallel with the floor plane of the miner 10, defined by the surface upon which the miner 10 crawler travels. This alignment does not have to be exact since the primary objective is to provide incremental motion information, not absolute orientation or position. It is the use of this incremental motion information by the rock detector 20, 120 that assists the geosteering concept to be effective by enabling faster and more accurate cutting decisions required to stay within the coal vein. This is better explained below.

If the advance of the cutter picks 14, due to the lowering or raising of the boom 11 to which the rotating cutter 12 is attached, is at a constant rate, then the gamma data could be correlated with time. However, there are many operational reasons why the rate of movement of the boom 11 is not constant. Another choice available is to correlate the gamma data with the actual incremental movement of the boom, which can be measured. Movement of the boom directly relates to the movement of the cutter, though there are potential errors.

Figure 9A:
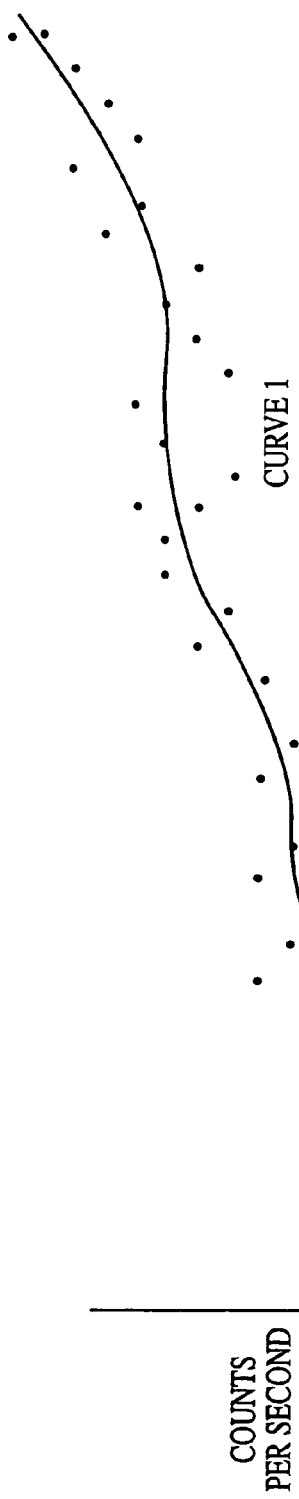
FIGS. 9a and 9b are graphs of gamma ray counts versus time and versus change of cutter boom angle.

Gamma counts correlated to time might appear as curve 1 in FIG. 9a. Notice that there is considerable scatter in the data in addition to some erratic trends within the data set. The general scatter is a result of gamma radiation being statistical in nature. There is no way to predict when a piece of the formation will issue the next gamma ray. Averaging the data over time is essential. Since the rate of the gamma counts is increasing as the rock interface is approached, in addition to the statistical variations, it is useful to use a well-known method for making predictions based on well behaved data that has a statistical component; that is, to correlate the data to an independent variable that is controllable. The change in the count rate is a result of the cutter removing the coal. A challenge, and an objective of this invention, is to provide a means to derive an accurate measurement of cutter motion, over short increments of time. Motion is the cause of the change in count rates as cutting continues, and precise increments of motion can be used to correlate the count rates for curve-fitting purposes.

Figure 9B:
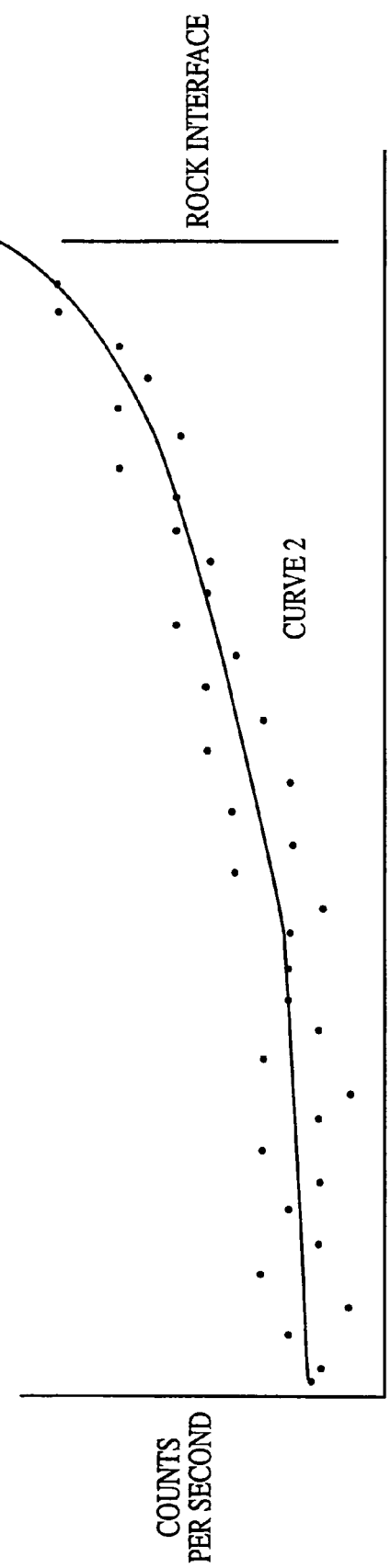

When correlated with actual incremental movements of the cutter (or the boom), the same data may produce a more useful curve such as curve 2 in FIG. 9b. The value of the better behaved curve 2 is that it can be used to predict the point at which a value will be reached that corresponds to the value expected at the point when the cutter picks 14 reach the coal-rock 15 interface. By plotting multiple curves for each energy range and by applying algorithms to these curves, more accurate predictions are possible, even for variable operating conditions.

Figure 10:
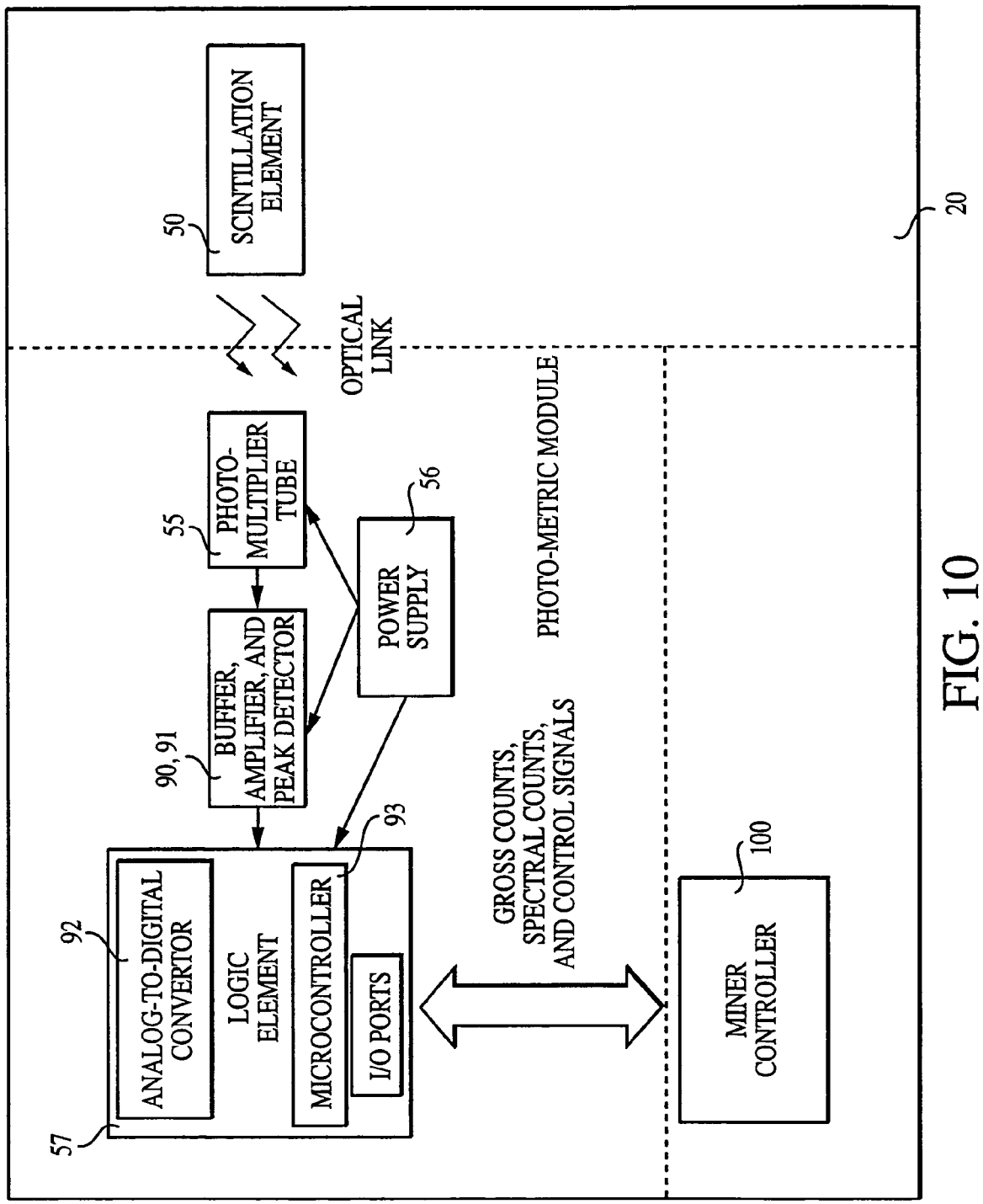
FIG. 10 is a schematic drawing of a logic element used with a rock detector constructed in accordance with an embodiment of the invention.

A logic element 57 is functionally depicted in FIG. 10. As explained earlier, this critical element is well protected from the harsh environment by an explosion-proof housing 59 that is dynamically isolated by a support system. The metallic housing 59 also protects against electromagnetic interference with the miner electrical systems 55, 56, 57. The logic element 57 receives electrical pulses from an amplifier 91 after being generated by the photo-multiplier tube 55. The electrical pulses from the photo-multiplier tube 55 may have amplitudes as low as 30 mV, and the duration may be as small as a few hundred nanoseconds. They are routed through the buffer 90, which isolates the input signal from the logic element 57 circuitry to prevent degradation to the signal. The amplifier 91 increases the amplitude and inverts the signal from a negative aperiodic pulse to a positive aperiodic pulse. The amplifier gain may be on the order of twenty. The actual gain value is dependent upon the voltage range of the input signal, the range and resolution of an analog-to-digital converter 92, the supply voltages, and the slew rate of the amplifier 91. The amplified signal may serve as a trigger signal to inform the microcontroller 93 that a new pulse is ready for processing. Since the pulse is aperiodic and short in duration, it is necessary to sample and hold the peak amplitude of the amplified pulse until the microcontroller 93 can act on the trigger signal and read the amplitude via the analog-to-digital converter 92.

Once the amplified pulse amplitude has been sampled, the microcontroller 93 resets the sample-and-hold peak detector of the sampled pulse, while maintaining a running count and/or average count over a given period of time. The pulse counts may be grouped into two or more energy ranges to form an energy spectrum. In particular, the counts in each energy spectrum, for each segment of time, such as 0.10 seconds, are correlated with the motion of the cutter since the last time segment. Discrimination and pattern recognition techniques are then used to characterize and predict the thickness of the coal, and thus the distance from the picks 14 to the rock 26. By applying various algorithms to the relationships that correlate counts with measured incremental movement within the energy spectrums and the gross counts, higher accuracy can be achieved under variable operating conditions.

A power supply 56 provides high voltage to the photo-multiplier tube 55. Noise is easily introduced into high impedance circuitry such as is required for the high voltage photo-multiplier tube 55. Having the power supply 56 inside the explosion-proof housing 59 protects the circuitry from electrically induced noise from the large motors and other machinery on the miner 10. The housing 59 also protects against this high voltage accidentally igniting gas and/or coal dust in the vicinity of the miner 10. Provisions are made for the microcontroller 93 to control the voltage from the power supply 56 to the photo-multiplier tube 55 to control its gain.

Figure 13:
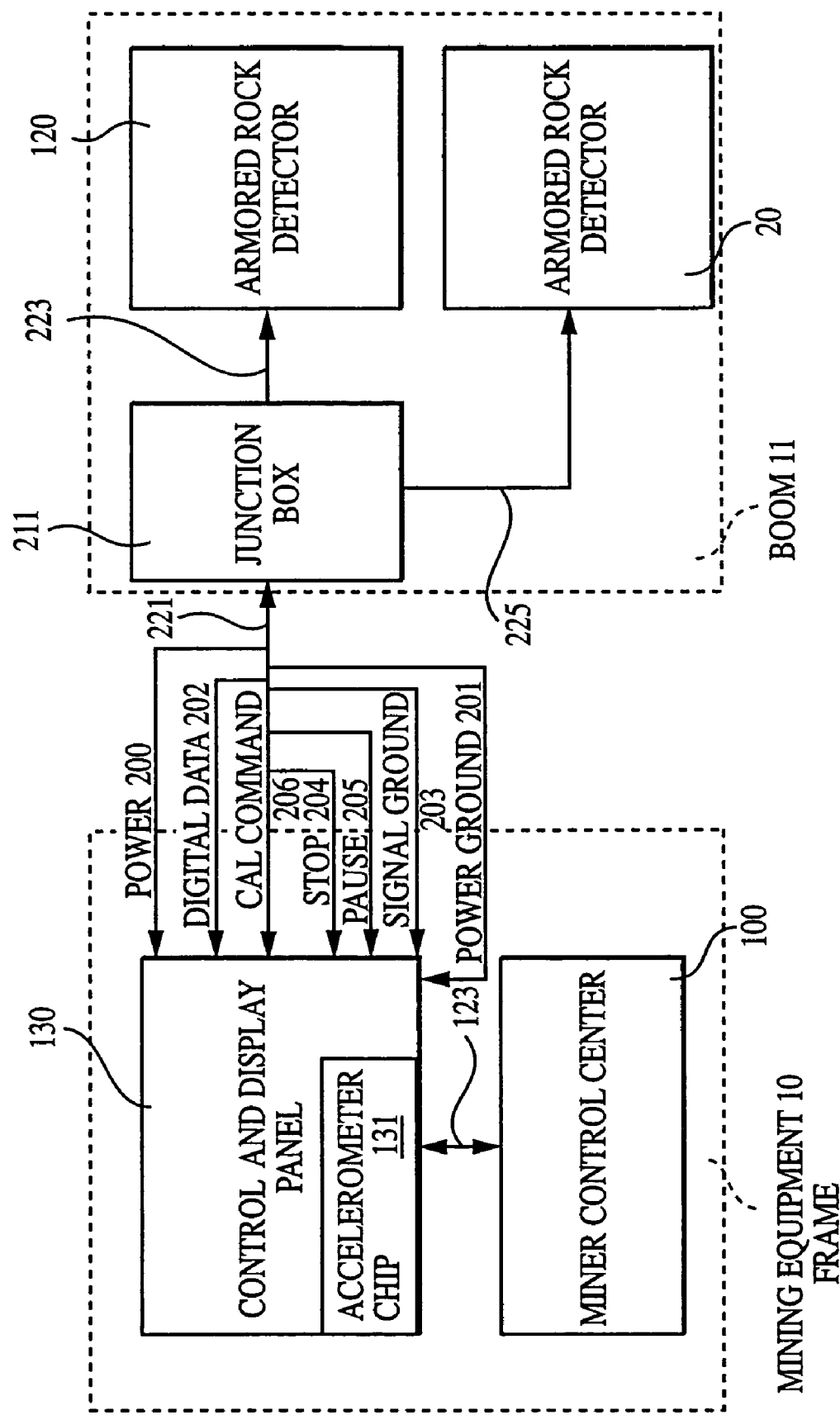
FIG. 13 is a schematic drawing of a junction box and cables used in an embodiment of the invention.
Figure 14:
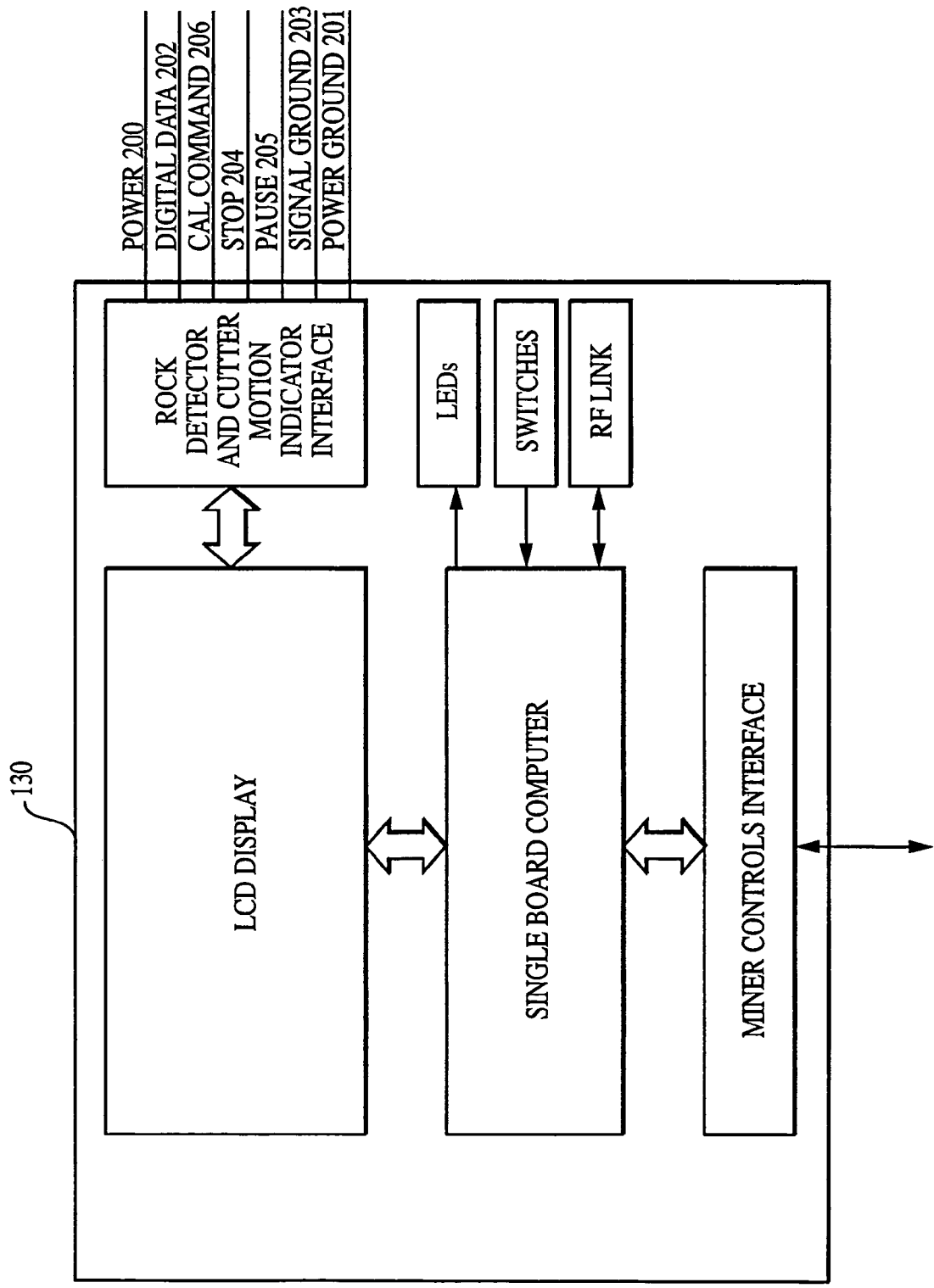
FIG. 14 is a schematic drawing of a control and display panel and cables used in an embodiment of the invention.
Figure 15:
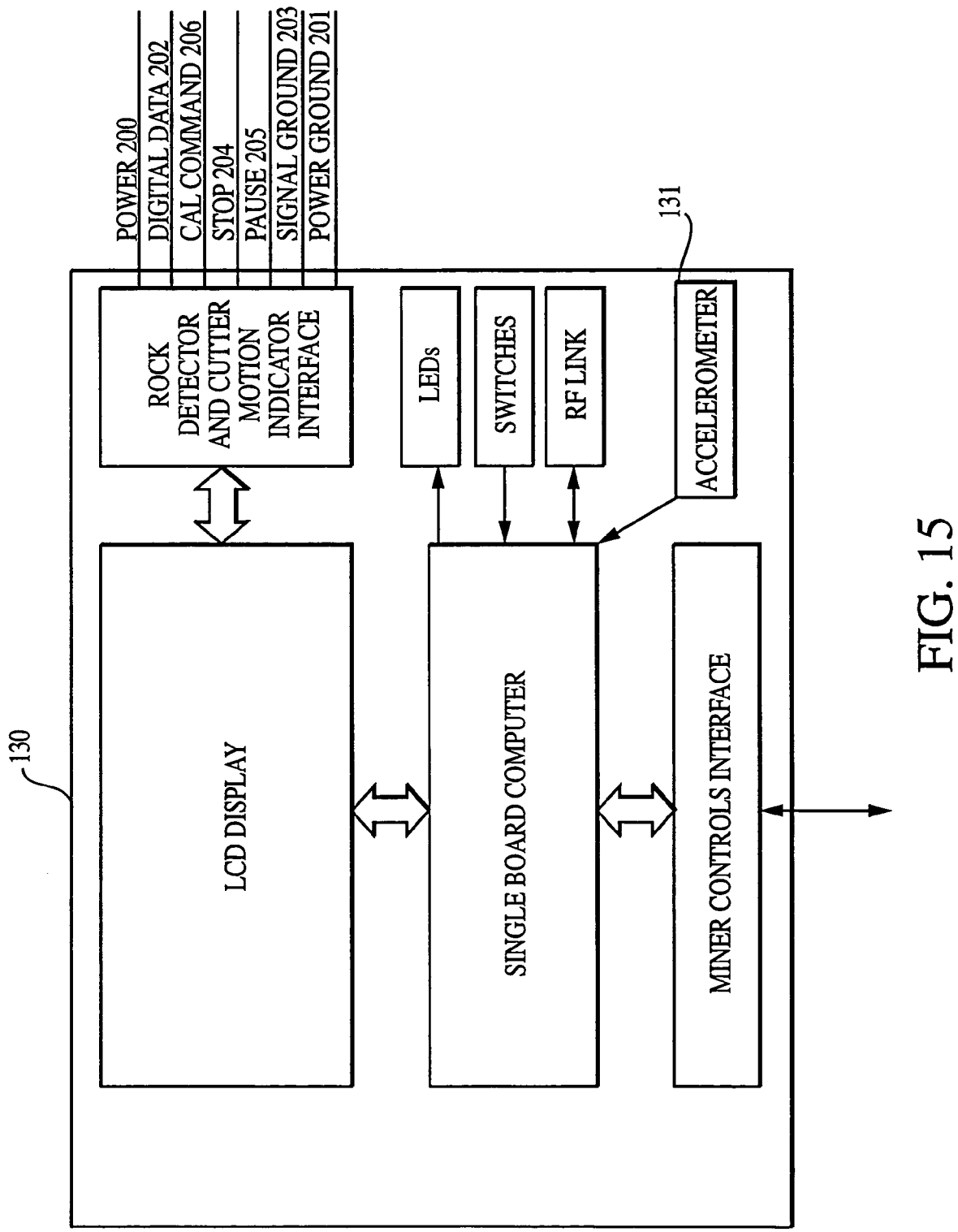
FIG. 15 is a schematic drawing of a control and display panel, accelerometer and cables used in an embodiment of the invention.

Provisions are made in the logic element 57 to continuously communicate with a miner control system 100 or a control and display panel 130 (FIG. 13). Most of the information is transferred in a serial data stream to minimize the number of wires. The protocol for the data stream can be changed by selection of components and programming to be RS-232, RS-485, IEEE 1394 or other serial communication standards as may be available. Decisions to stop or pause the cutter 12 are included in the data stream, though a separate wire 204 and 205, respectively (FIG. 13). The data stream includes a time stamp, gross counts per time increment, a running average of the counts over a periods of time such as 0.5 seconds and two seconds, motion per time increment, and a data scatter/accuracy probability coefficient. Functional, logical, and manual override capability at the control and display panel 130 or in the miner control center 100 can be provided as desired. The control and display panel 130 may also be used to track the stop positions of the cutter 12 at the floor and the roof to produce a profile of the tunnel being produced by the miner for historical purposes.

If the cutter 12 overshoots the interface 15 and actually enters the rock 26, it is important that the cutting be stopped immediately. This is accomplished by keeping a running count over a period of time between 2.0 seconds and 4.0 seconds. A sudden increase in gross counts above the previous running average produces a stop signal along the stop wire 204. Occasionally, there may be dislocated radioactive materials inside the coal vein 24. If this happens and the cutter 12 is stopped too early, the operator can override by releasing a shear control switch (not shown) on the miner 10 controls and immediately turn it on again. If precise cutter motion information is available so that the logic can determine that the stop decision is not reasonable, it can issue a decision to slow the cutting.

One benefit of introducing precision geosteering technology into coal mining is that doing so lays the groundwork for an almost boundless future growth of software techniques, algorithms, and generally smarter controls for use on mineral mining equipment. Given that the operator is so intimately connected with the minute-by-minute operation of a continuous miner, the need and opportunity for continual enhancements in coal mining may be greater in some respects than for oil well drilling.

Figure 11:
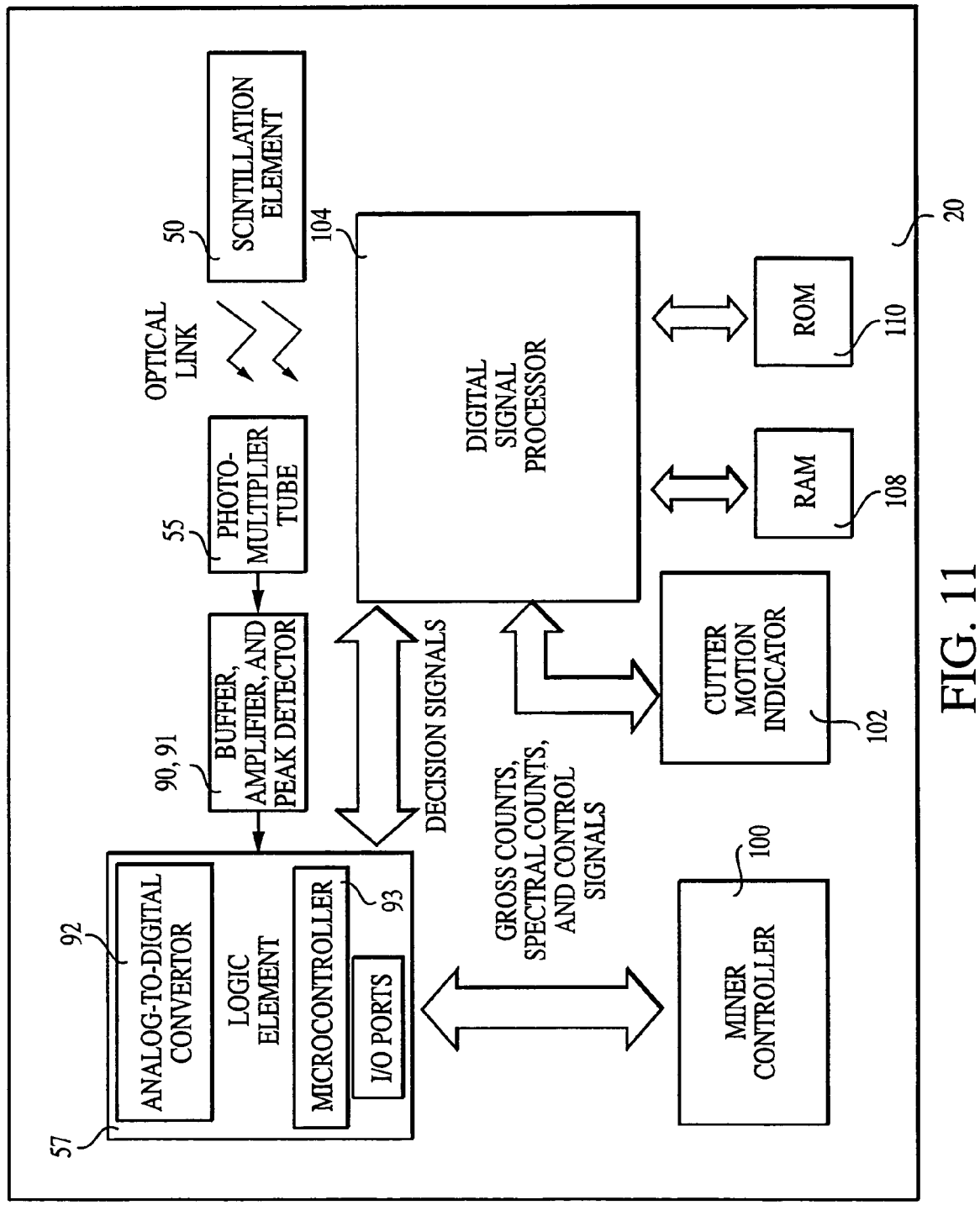
FIG. 11 is a schematic drawing of a logic element and digital signal processor used with a rock detector constructed in accordance with an embodiment of the invention.
Figure 12:
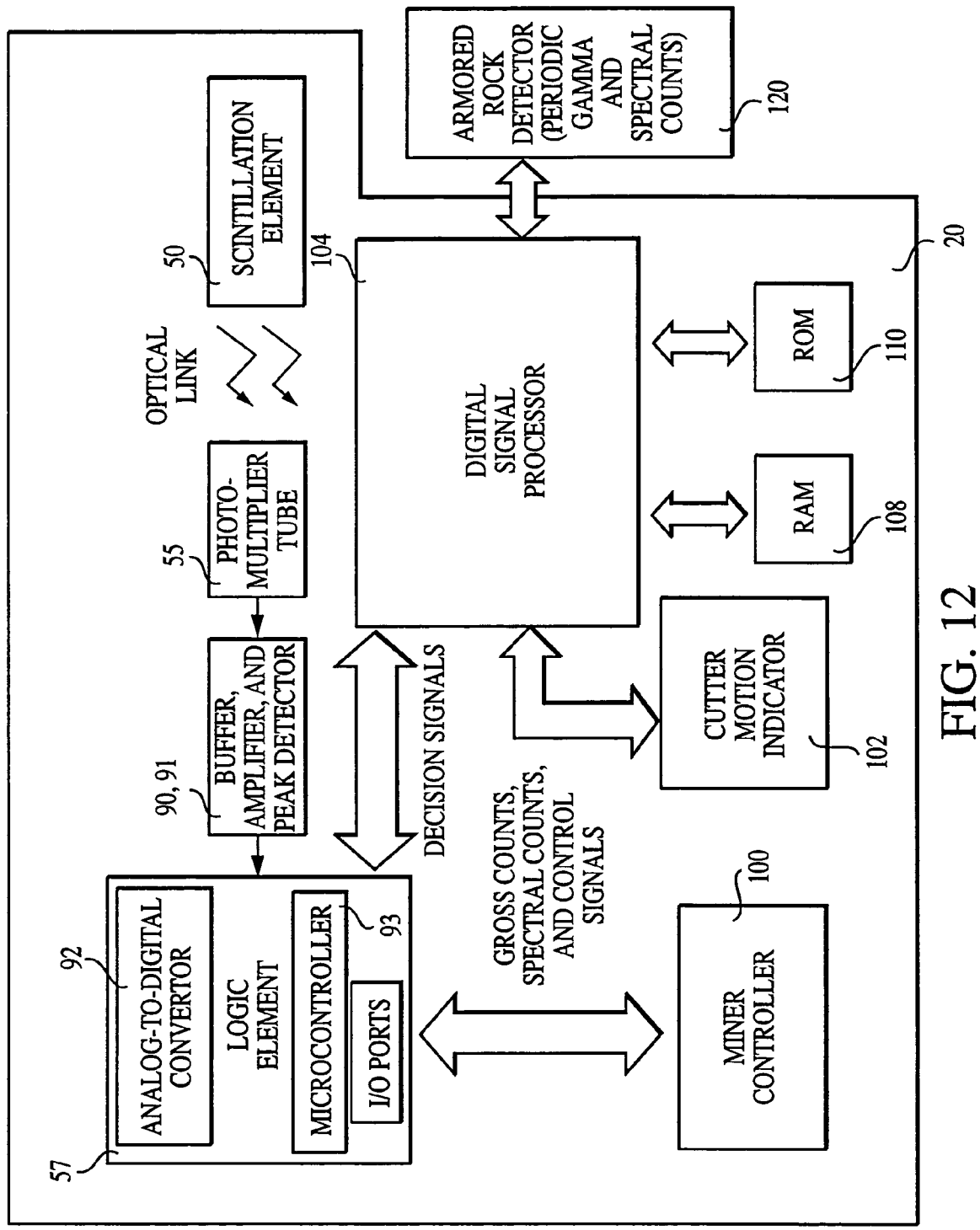
FIG. 12 is a schematic drawing of a logic element and digital signal processor used with a pair of rock detectors constructed in accordance with an embodiment of the invention.

In order to allow for growth in computational capability, a more powerful processor, such as a digital signal processor 104 (FIGS. 11-12) can be used. A greater number of algorithms may be stored and executed with greater speed. By adding larger program and data memory in the ROM 110 and RAM 108, respectively, the digital signal processor 104 can execute multiple algorithms in parallel to calculate coal thickness and do so at greatly increased speed than the microcontroller 93 alone. If the accuracy coefficient indicates that the data is inconclusive, the processor can call up other algorithms and take other actions before making a final decision. Digital signal processors, currently available, require a larger footprint than the microcontroller 93. As such, only rock detectors having scintillation elements that are 1.75 inches in diameter or greater will have sufficient space in the explosion-proof housing. Typically, a digital signal processor using current technology can perform 80 million instructions per second (MIPS) or more. The microcontroller 93 is generally limited by current technology to 10 MIPS or less and is further limited by its inability to access large amounts of ROM or RAM without additional circuitry.

The armored rock detectors 20, 120 can be accommodated electronically and logically by connecting the logic element 57 of the first detector 120 to the digital signal processor 104 in the second rock detector 20. Electrical junctions between the two detectors 20, 120 are accomplished in a small, standard explosion-proof junction box 211.

Use of a rock detector 120 at the roof not only allows faster, more accurate cutting decisions at the roof but the information from the roof detector 120 can be used to support a higher level of logical decision-making. For example, it is known that the thickness of the coal seam varies more slowly than the elevation of the floor or roof. Therefore, if anomalies exist such that the accuracy probability coefficient produced by the floor rock detector 20 is unsatisfactory, reflecting a high level of scatter in the data, the decision on that cut can be based on the last cut at the roof less the thickness of the coal on the last cut. Or, if the logic element 57 cross-checks a decision and determines that the decision is not consistent with other known data from the other detector, the logic element 57 can elect to slow down the cut in order to obtain more accuracy or can alert the operator to the condition, giving the operator the opportunity to override. Fortunately, these situations are anomalies and do not all have to be solved in an ideal manner, but provide opportunities to make future improvements to further the efficiency of the operation. As the miners become increasingly more automated, having a variety of software routines that can be called into play will be an asset.

Actual incremental movements of the cutter 12 toward or away from the rock interfaces 15, 16 can be determined in various ways. A vertical displacement sensor may be used to determine actual incremental vertical movements of the rock detector, by measuring the change in distance of the cutter 12 or the boom 11 from a known position on the floor, roof or wall. Such a sensor might be a mechanical displacement, optical, acoustic or other gauge. The rock detector performance and the geosteering control system strategy are not dependent upon the source of the measurements of the incremental movement.

Some of the operational aspects of preferred embodiments will now be discussed in more detail. An object is to utilize an accelerometer design that has been proven over many years in rugged and demanding environments, such as directional drilling for oil. The accelerometer 60, shown in FIG. 8, is oriented so that whenever the tips of the cutter picks 14 are at a nominal floor position, on a level floor, the direction of sensitivity of the accelerometer would be parallel to the floor, in the same direction as the forward advance of the continuous miner. In that configuration, the accelerometer 60 would ideally indicate a zero reading. However, if the boom 11 is raised or lowered, a component of gravity is measured against the axis of sensitivity 83 of the accelerometer 60. The measurement of the change in angle can be made very precisely by this method.

In actual operation, the floor will generally not be level and so the nominal zero position of the accelerometer 60 would not produce a zero reading. This is not a problem since the objective is to measure the change in position, or relative movement and not the absolute position. Changes in gamma measurements relative to actual incremental changes in position will produce a curve similar to curve 2 in FIG. 9b.

There are operational considerations that must be addressed in order to achieve a high degree of precision from the accelerometer 60. One is vibration. As the cutter 12 rotates to cut the coal, vibrations are induced into the boom 11. Vibrations in the vertical direction, generally perpendicular to the axis of sensitivity 83 of the accelerometer 60, have only a secondary, small effect on the accuracy of the accelerometer 60. However, vibrations and movements back and forth are also experienced and such movements are interpreted by the accelerometer 60 as rotation of the boom 11 and vertical movement of the cutter 12. Another effect of the operation on the accuracy of the accelerometer 60 is that of the vertical movement of the front of the miner 10 as a result of the force being applied to the cutter 12 by the hydraulic cylinders (not shown) connecting the boom 11 to the body of the miner 10. If left unadjusted, the data would be in error by the amount of vertical movement of the miner 10 that occurs during the shearing stroke. Both of these sources of error are addressed below.

Referring back to FIG. 8, three elements serve to isolate the accelerometer 60 from damaging shock and high frequency vibrations resulting from the miner 10 mechanisms and from impacts by materials being thrown against the armored rock detector 20, 120 by the rotating cutter picks 14. These three elements are (1) elastomeric ridges 82 on the enclosure 81, (2) the flexible support sleeve 68 positioned between the dynamic housing 80 and the explosion-proof housing 59, and (3) the flexible support sleeve 61 between the accelerometer module 60 and the explosion-proof housing 59. Lower frequencies will pass through all three levels of isolation. The effects of the lower frequencies on the data are minimized by software techniques. However, the operational methodology that will now be described greatly reduces these effects before they enter into the data stream.

There are many situations faced during the operation of continuous miners 10 so that they cannot all be discussed. Fortunately, an operator can be quickly trained on how to utilize the geosteering system to simplify his job and to be more effective in most of the situations that he encounters. A typical example of the procedure for cutting at the coal face 17 (FIG. 1) is to first sump the cutter 12 into the face near the roof and then to raise the cutter picks 14 to the coal-rock interface 16. Next, the boom 11 is lowered so that the cutter 12 shears down toward the rock interface 15 at the floor. In most coal formations, this shearing process can be performed faster than the gathering arms and conveyor on the continuous miner 10 can carry away the coal. It is not unusual for the operator to temporarily stop or pause the shearing for two or three seconds to allow the coal handling equipment to carry away some coal before cutting the rest of the way to the floor. This temporary pause, whether performed manually by the operator or automatically by the geosteering system, is an opportunity to establish a precise reference position for starting the data correlation process.

The logic element 57 (FIGS. 10-12) issues a pause command when the boom 11 reaches a desired angular position, even if the operator does not do so. In either case, the logic element 57 recognizes that the boom 11 has stopped moving and quickly determines the precise angle of the accelerometer 60, and thus the rock detectors 20, 120. It is important to note that it is a simple arithmetic calculation to convert the angle measured by the accelerometer 60 to a linear distance perpendicular to the plane of the continuous miner 10 by use of the formula L×sin (theta) where L is the length of the boom 11 and theta is the angle measured by the accelerometer 60 in the rock detector 20, 120. Further, determining the "height" of the cutter 12 relative to the plane on which the crawler is theoretically advancing is not of any significant value to the objective of correlating gamma data being taken by the rock detector 20, 120. The primary objective is to correlate the gamma counts with precise motion that corresponds to the changes in gamma counts, not necessarily the measure of absolute "height" above some reference. Therefore, the incremental change in the angle of the rock detector, which does directly relate to the "height" of the rock detector 20, 120, may be chosen as the parameter which is used to correlate changes in gamma measurements to produce the curve 2 shown in FIG. 9b. It is the incremental change in gamma counts versus an incremental change in angle that is analyzed to predict the intercept of the cutter picks 14 with the coal-rock interface 15, 16, through curve fitting techniques.

After the first pause in the shear down stroke is achieved at a selected angle which might correspond to the cutter 12 being in the range of 6-10 inches above the nominal zero position, a precise measurement of the angle is made. If the operator feels that the pause is being commanded too early or too late, he can select a different setting. Provisions are made for the operator to be able to adjust the duration of this first pause if desired, and the operator also can override simply by resuming the down shear. As the selected angle is achieved and motion is stopped, the logic element 57 acquires gamma counts at intervals of approximately 0.1 seconds. While loose coal, such as the coal found in the coal pile 21, is fairly transparent to radiation, it does affect gamma radiation readings. Thus, it may be necessary to pause the sump midway through the sump to enable the rotating picks to clear away the coal.

Upon the initiation of the pause command, a solenoid that controls the hydraulic system on the miner 10 closes to stop fluid flow. However, if the operator has driven the cutter 12 hard into the coal, there will be some pre-load taken by the structure and the hydraulics so that the shear down will not stop instantly. In some cases, the front of the miner 10 may be raised a few inches due to the high force being applied to the cutter 12 so that the cutter is physically higher than the angle indicated by the accelerometer 60. Fortunately, this tends to be a self-correcting problem because the cutter 12 will continue to lower, after hydraulic flow has stopped, until the pre-load has been relieved and the front of the miner 10 has returned to its unloaded state.

Once the cutter 12 has essentially stopped moving down, the logic element 57 will record the angle and begin accumulating gamma counts. The difference between this angle and the angle at which the last cutting sequence was stopped is determined and the number and duration of the expected shearing pulses is calculated. The actual number of pauses will depend on where the interface is actually located. The rock detector will calculate the approximate number of shearing pulses, based on the position of the cutter 12 relative to the previous shear down. Pulses of approximately 0.25 second duration will result in the cutter 12 being lowered approximately 1.5 inches. At the end of the pulse, the cutter 12 will not yet have traveled the fill 1.5 inches but will continue for a short time. After the pulse stops and the solenoid controlling the hydraulics closes, the cutter 12 will complete its travel and stop. Some vibration will continue due to rotation of the drum 12 and incidental contact with the formation. As soon as the accelerometer 60 determines that vertical movement has essentially stopped, a precise determination of the movement since the last stop is calculated. It is this precise incremental movement against which the gamma counts are correlated.

As the cutter 12 nears the angle at which the shearing command was issued on the last shearing stroke, the duration of the pulses may be reduced, depending upon the accuracy coefficient that is being continuously calculated. Data collected between these pause points will be assigned a position value between the position corresponding to the pause points. Through this methodology, very little time will be consumed in the pauses. The operator cannot actually see a stop in motion of the boom. Since the cutter 12 can usually extract coal faster than the miner 10 can carry it away, the addition of pauses does not slow the mining process. The cutter will continue to remove coal as fast as the rest of the system can remove and transport it. Instead, the effect is to increase speed because only coal is being mined. By not mining rock, room is made available on the conveyor and in shuttle cars for more coal. Total coal production is increased while the mining of rock is reduced.

As data is accumulated, the logic element 57 develops a curve and begins to make a prediction as to the location of the coal-rock interface 15, 16. Upon reaching the angle associated with the location of the coal-rock interface 15, 16, the logic element 57 will issue a stop command and signal the operator that the shearing stroke has been concluded. In a more automated arrangement, such as for high-wall mining, this stop signal can, instead, be sent to the automated control system.

The rotating drum 12 that supports the cutter picks 14 on the front of a continuous miner, is supported on a boom 11 that moves up and down in order to force the picks 14 into the coal being cut. During the shearing stroke, the miner 10 frame is not moving forward. By precisely measuring the rotation of the boom relative to the stationary miner 10, this angular measurement can be used to correlate gamma counts to the incremental motion. A source of error is that the miner 10 frame itself may move away from the floor due to the high forces exerted by the continuous miner as it forces the cutter 12 down into the coal. As the miner 10 moves, it changes the vertical position of the pivot point for the boom 11. When the control process described above is used, this motion has no effect on the results. If the coal is very hard and the cutting is very fast, it may be desirable to compensate for this motion in other ways as described below.

Although the miner control center 100 can be configured to respond to the cutting decisions from the rock detector 20, 120, the addition of the control and display panel 130 is desirable (S. 13, 15, 16). If a control and display panel 130 is provided for the rock detector, a small acceleration microchip 131 may be included to automatically correct for errors that result from vertical movement of a pivot pin 22 (FIG. 1) about which the cutter boom 11 rotates. The small solid-state accelerometer 131 is mounted on a small circuit board that measures the tilt of the miner 10. By measuring the amount that the miner 10 is tilted, and transmitting this information to the rock detector 20, 120, the rock detector 20, 120 will adjust the data to remove the error.

First, the angular measurements by the accelerometer in the rock detector are converted to linear height numbers by the simple calculation of L×sin(theta), where L is the length of the boom and theta is the angle measured by the accelerometer 60 in the armored rock detector 20. Then, the vertical movement of the pivot pin 22 on the miner frame is calculated by the same equation, except that the length is the distance from the pivot pin 22 to the point on the crawler about which the frame pivots and the angle is the tilt of the miner frame as measured by the accelerometer 131 in the control and display panel 130. This error number is sent to the rock detector 20, 120 where it is subtracted from the height calculated using the accelerometer angle of the rock detector 20, 120 and boom 11. Making these adjustments permits the incremental movements to be accurately measured even when the pivot pin 22 is moving.

The control and display panel 130 may be configured as needed for the type of machine and the specific operational requirements for a specific mine. It may include a liquid crystal display (LCD), light emitting diodes (LED), and/or incandescent bulbs. Typically an LCD would display system parameters, such as gamma counts, boom movements, coal thickness calculations and system status information. LEDs would provide visual indication of the miner status such as calibrating, cutting, start, pause, stop and rock contact warning. Furthermore, the operator can change system settings and access data and parameters as needed.

Due to the electrical components in the control and display panel 130, it must be enclosed in an explosion-proof housing (not shown). Since operational needs and preferences are subject to change, particularly in a rapidly advancing technology such as this, there is a need for the control and display panel 130 to be re-configurable in various ways without having to re-certify the design for Mine Safety and Health Administration requirements. Frequent re-certification can be avoided by eliminating penetrations through the pressure proof window or housing, for switches or controls. Penetrations, other than for standard cable entries, can be eliminated by use of electromagnetic switches that are activated by a magnetic wand that that will work through a certified pressure proof window. Whenever the magnetic wand is moved on the outside surface of the window, near a switch that is located on the inside of the window, the switch will trip. Switches may be momentary or may toggle on/off. Easier to use configurations include incorporation of the wand into a compound lever so that it can be simply moved to operate a switch and then be returned to a stowed location. The control and display panel may also be operated remotely by an RF link as is routine for the miner control center 100.

The various embodiments described above produce a faster, more accurate system, that is simpler and less costly that conventional systems previously used. However, other important improvements can be made as described below. Specifically, a separate cutter motion indicator can be added to the system to provide very accurate, almost instantaneous measurements of cutter movements.

Figure 16A:
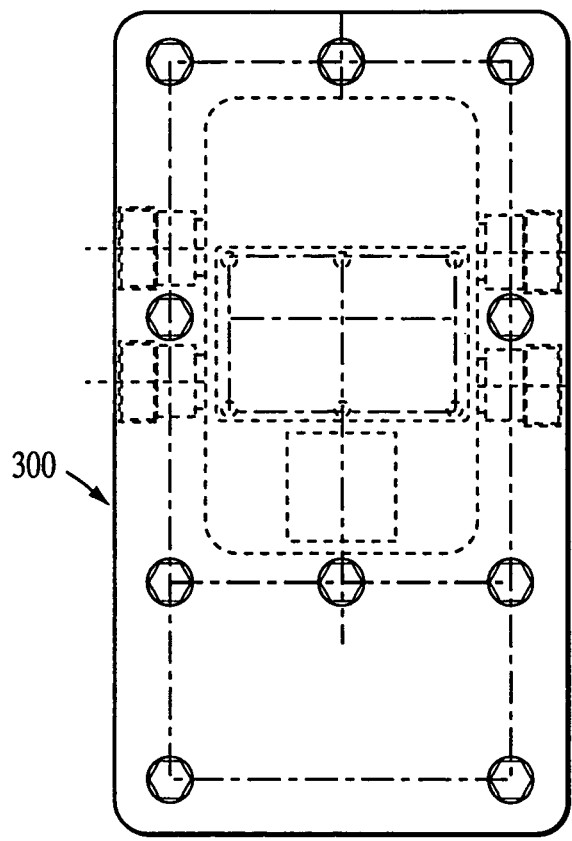
FIG. 16a is a view of a cutter motion indicator used with a rock detector in accordance with an embodiment of the invention.
Figure 16B:
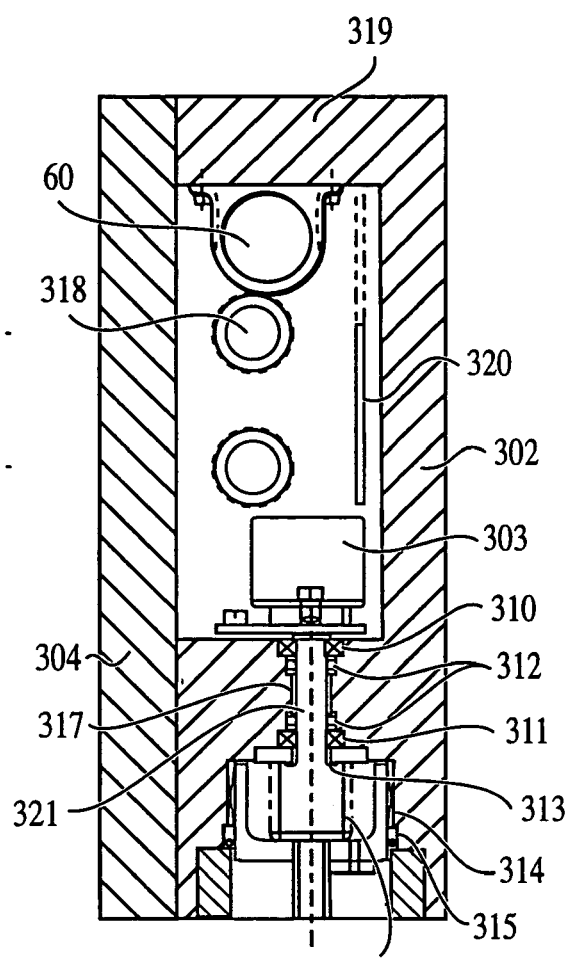

Every mining company is constantly looking for ways to advance the miners at a faster rate in order to mine more coal. Great improvements have, in fact, been made during recent years, thus helping to keep the cost of mining coal in check. This has contributed somewhat to the problem of mining more rock. As the miner is moved more quickly, cutting errors are more difficult to avoid by the operator. With experience, the operators do improve. But, as new operators must be added over time, loss of production and undesirable mining of rock, a real problem at all times, is made worse with inexperienced operators. Therefore, a challenge is to make cutting decisions more accurate and quicker. As the miner 10 is then able to advance faster, more improvements are, again, needed. Some conventional systems employ inclinometers that respond too slowly to allow the accuracy and speed that is desired. Even the very precise accelerometers described in the earlier embodiments, though significant improvements, may place some limits on speed in some conditions. As miners generally become more automated, speed and robust control become more important requirements. A separate cutter motion indicator 300 (FIGS. 16*a*, 16*b*, 17) can be added to the system to provide almost instantaneous measurements of cutter movements. The indicator 300 is positioned at the pivot of the boom.

The cutter motion indicator 300 can be configured in different ways, depending upon the configuration of the mining equipment and the operational requirements. When using a cutter motion indicator 300, an accelerometer 60 is not required inside the rock detector. The space normally occupied by the accelerometer 60 may be used for other purposes.

An explosion proof housing 302 is used to contain an optical encoder 303 and electronics 320 to ensure that those components will not be able to ignite gas or dust in the vicinity of the miner 10. Thick steel walls 319 of the enclosure 302 are capable of withstanding considerable impact without losing pressure integrity. An O-ring seal (not shown) provides the primary seal between the lid 304 and the housing walls 319. Multiple seals 311, 312, 313, 317 ensure pressure integrity around a shaft 321 that transmits the rotation of the boom 11 to the optical encoder 303 inside the enclosure 300. Dual seals 312 preferably are high pressure seals made of PEEK. In addition, a bushing 317 around the shaft 321 is provided as added protection. The dimensions of the shaft 321 and the bushing 317 are controlled such that the maximum clearance is 0.002 inches. This small gap ensures that even if gas is able to pass around the non-metallic seals 312, the amount of escaping gas will be so small so that it will not be hot enough upon exiting the gap to ignite any gas or dust that might be around the enclosure 302.

Rotation of the boom 11 is transferred into rotation of the shaft 321 which in turn drives the optical encoder 303. The optical encoder 303 indicates rotation of the shaft 321 by emitting pulses, a single pulse representing a specific amount of rotation. Provision is made to indicate the direction of rotation as well. Optical encoders, such as the optical encoder 303, are commercially available that are very precise, accurately indicating rotation of small fractions of a degree. Pulses from the optical encoder 303 representing the amount of rotation are received by a counter and adder assembly 320. The number of pulses are added and subtracted as the boom 11 rotates. Incremental movement of the cutter 12 toward the rock interface 15, 16 is calculated by determining the product of the length of the boom 11 and the arc-sine of the angle rotated.

Though very precise, the optical encoder 303 does not indicate the actual distance of the cutter 12 above the rock interface 15, only the amount of rotation per increment of time, typically 0.10 seconds. It should be remembered that it is the actual distance of the cutter 12 to the rock, or equivalently, the thickness of the coal that is not known. If the distance to the rock could be known with sufficient accuracy, without the use of the armored gamma detector 20, 120, the detector would not be needed. Therefore, the information that can be known to high precision through the use of the cutter motion indicator 300 is the incremental changes in position as determined by the optical encoder 303. With this precise data on incremental changes, the armored gamma detector 20, 120 determines the distance to the rock 15, 16 through the interpretation of the gamma radiation 28 as it relates to these incremental changes in position.

Motion of the miner 10 frame during the cutting process, as explained earlier, is a source of error in the cutter motion data being provided to the armored rock detector 20, 120 by the cutter motion indicator 300. Accelerometers are incorporated inside cutter tools for drilling oil wells for the purpose of determining angle relative to gravity to a high degree of accuracy. The accelerometer 60 is such a device. The accelerometer 60 determines if its angle relative to gravity changes, which is a measurement of any change of the angle of the miner 10 frame relative to the gravity vector. It is also simple to then calculate the instantaneous change in height of the boom pivot pin 22 that results from this rotation. These calculations are performed by the counter and adder assembly 320.

Once precise cutter motion data is available, along with cutting control decisions from the armored rock detector, additional information can be derived. Typically, this would be accomplished in the control and display panel 130 or within the control system provided by the continuous miner. For example, the cutter 12 motion for each cut, including the point at which the armored rock detector issued a stop command, the actual position that the stop occurred, any indications of contact with rock, and other information is readily available for historical storage and/or further evaluation or use. Since the stop position at the floor and the roof are known each cut, relative to the previous cut, tracking these stop points in the control and display panel would provide a contour of the floor and the roof. Decisions can be made in the control and display panel 130 to override the rock detector 20, 120 or decisions can be made independent of the rock detector under certain special conditions. For example, suppose that a cut is stopped at a particular position. Then, suppose on the next cut the detector gives a false indication due to an anomaly in the coal vein, and issues a command to stop the cutter six inches above the position of the previous cut. Logic can be included in the control and display panel 130 that would override or ignore the armored detector 20 decision. The decision could be made to stop the cutter 12 at the same height as the last cut, relying upon the knowledge that the formations will not change six inches over the distance of one cut. Or, alternately, the decision could be to slow the cutter until the rock detector 20, 120 detects that the rock has been contacted, indicated in a sudden jump in gross gamma counts.

Figure 17:
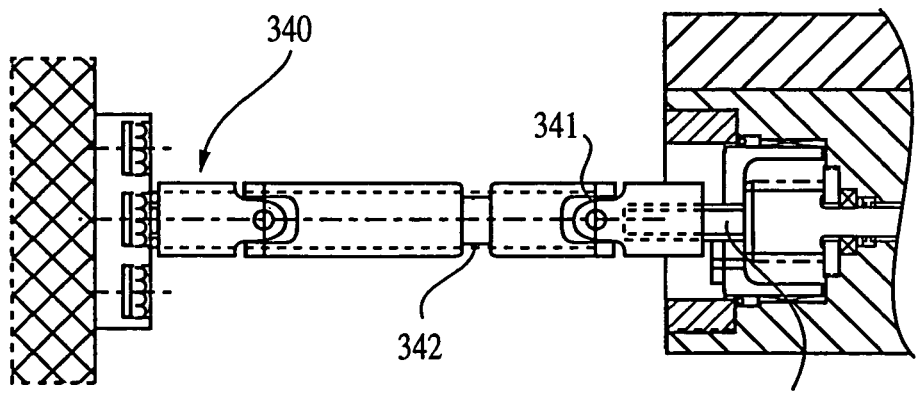

A suitable structure must be provided for transferring the rotation of the boom into the shaft 321 in the cutter motion indicator 300. If a continuous miner is configured such that the pivot pin 22 rotates with the boom 11, then a connection can be made directly at the center of the pivot pin 22. However, for this configuration, there are some mechanical challenges. The cutter motion indicator 300 is a precise instrument. Its shaft 321 must be mechanically attached to the boom 11 so that any rotation of the boom 11 is transmitted to the encoder. However, it is difficult to locate the cutter motion indicator 300 at a precise distance from the pivot pin 22. Further, due to the large forces endured by the miner components, some relative linear motion between the cutter motion indicator 300 and the pivot pin 22 must be tolerated. This has been accomplished by the use of a spline 342 (FIG. 17). Similarly, it is not practical to provide an exact alignment of the cutter motion indicator 300 and the pivot pin 22 to which it must be attached. To overcome this obstacle, a dual universal joint 340, 341 is provided. With these joints 340, 341, 342 in the drive train assembly, linear motion perpendicular to the drive train assembly will not induce forces into the drive train assembly. Similarly, small angular misalignments between the drive train assembly and the axis of the pivot pin 22 around which the boom 11 is rotating will not induce forces into the drive train assembly.

Addition of the dual universal joints 340, 341 and spline 342 may introduce a possible backlash problem. Addition of an anti-backlash spring 316 eliminates backlash by removing slack in the universal joints 340, 341 and the spline 342.

There are multiple methods for obtaining angular rotation of the boom relative to the frame. One method is to attach a shaft at the center of the pin upon which the boom is hinged. However, some miners are designed such the boom bearing rotates on the pivot pin 22 such that the pin 22 itself does not rotate. A lever (not shown) can be attached to the boom 11 that transfers the boom rotation to a point that is along the bearing axis. Also, the pivot pin 22 on which the boom 11 hinges usually wears so that it becomes loose. The combination of the spline 342, dual joints 340, 341, and anti-backlash spring 316 prevent these undesirable linear movements from entering into the rotational measurement.

On many miners, the pivot pin 22 does not rotate with the boom 11, the bearings being on the boom 11 side of the pivot pin 22. In this case, a lever must be added to the boom 11 to transfer the boom 11 rotation to a point along the axis of the pivot pin 22 on which it is rotated. The provisions within the drive train assembly discussed above are effective for relieving relative linear motion and misalignments on this miner configuration as well.

Calibration of the optical encoder 303 may be accomplished occasionally if needed. This would typically be performed at the beginning of a shift and during major moves of the miner within the mine. To accomplish a calibration, the continuous miner 10 is driven up to the face of the coal at a location where the floor is flat, not necessarily level, prior to start of the cutting operation. The cutter 12 is then lowered to the floor.

A calibration command is sent to the cutter motion indicator 300 from the control and display panel 130 through wire 206. This calibration command would also be forwarded to the armored rock detector 20, 120 so that gamma readings can be recorded as well. The counter and adder assembly 320 in the cutter motion indicator 300 reads the optical encoder 303 and the accelerometer 60 and accepts that reading as the zero position. The cutter 12 then is raised to the roof and the calibration is repeated and this reading is taken as the zero roof position. During the next cut, the readings will be referenced to this starting reading. The second cut will be referenced to the first cut, etc.

The primary source of motion information is from the optical encoder 303. This encoder 303 has a disk with holes that move past a light source as it is turned by the boom motion through the drive train assembly described earlier. The holes in the disk are spaced to provide a certain degree of angular resolution. Typically, the angular resolution of a commercially available encoder is on the order of 0.06°. The output signals, A and B, from the optical encoder 303 are pulses that can be counted by the microcontroller 93 or other logic. Furthermore, if the pulse from A leads the pulse from B, then the rotation is clockwise. Thus, the running count of pulses is incremented by one. If the pulse from A lags the pulse from B, then the rotation is counter-clockwise. Thus, the running count of pulses is decremented by one. At any given time, the number of pulses counted can be converted to an angle measurement simply by multiplying the current pulse count by the angular resolution, thereby giving the angle of the boom 11.

To sense the tilt of the miner 10 frame, an accelerometer 60 is used inside the cutter motion indicator 300. An accelerometer 60 can measure angle based on a change in orientation with respect to the gravity vector. The gravity vector is the same all over the earth; it points toward the center of the earth. With the accelerometer 60 fixed to the miner 10 frame, the orientation of the accelerometer 60 changes as the miner 10 tilts up or down. The output signal from the accelerometer 60 is typically an analog voltage, or current, which can be converted to voltage, that varies as the G force varies according the resolution of the device. Typically, a commercially available accelerometer has a resolution of 1 micro-G. The output voltage can be sampled by an analog-to-digital converter 92. The sampled value can be converted to angle by referencing it to a G force of 1 and taking the arc-sine. Thus, the tilt of the miner 10 frame is measured during the shearing stroke and the vertical movement of the pivot is measured, subtracted from the measurement made by the optical encoder 303, and the difference is reported to the rock detector 20.

Figure 18:
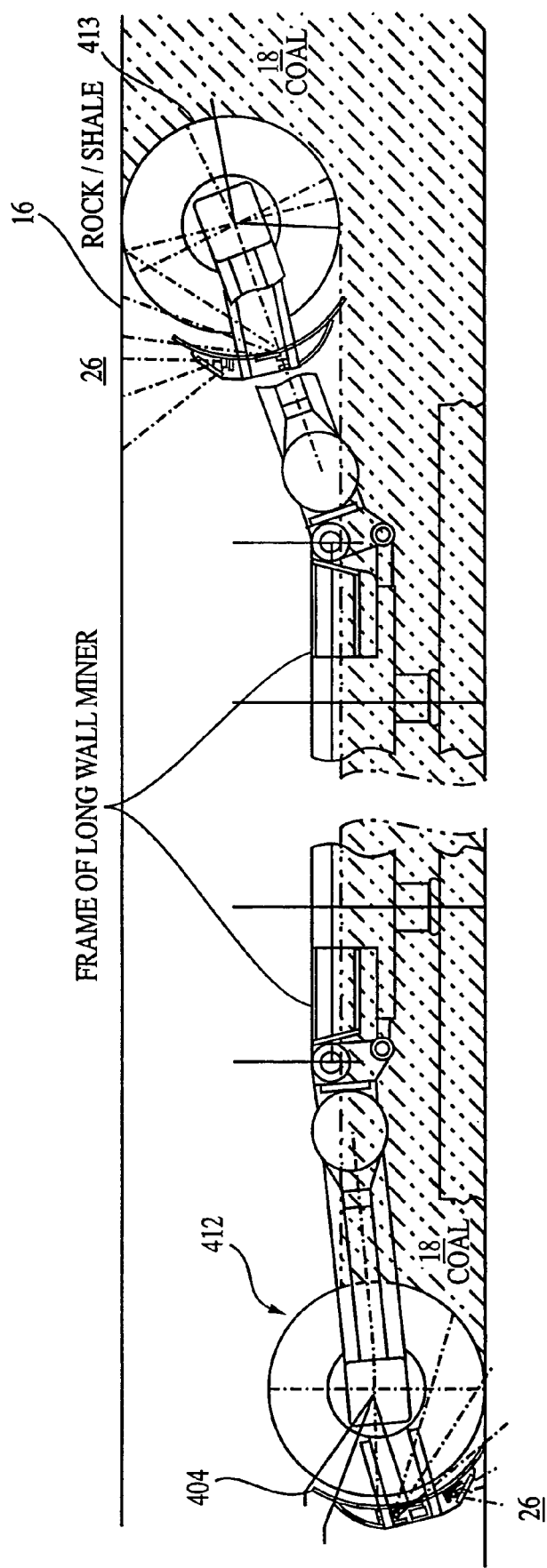
FIG. 18 is a schematic view of a longwall shearing system in accordance with an embodiment of the invention.

Another preferred embodiment applies geosteering to long-wall shearing systems. Long-wall miners have two shearing drums 412, 413, as shown in FIG. 18. When moving one direction, the cutting drum 413 is in the front and is referred to as the leading drum. It cuts at the coal/rock interface 16 at the roof and the second drum 412, referred to as the trailing drum, cuts at the floor interface 15. Typically, one operator positions himself near the front of the miner and visually controls the height of the leading drum 413 so as to remove all the coal 18 and to remove as little rock 26 above the coal 18 as practical. A second operator controls the vertical position of the trailing drum 412 that is located approximately 40 feet behind the leading drum 413. Visibility of the trailing drum 412 is usually severely limited due to the shearing assembly being filled with coal. In some operations, rock may fall from the roof, obscuring the cutter 412. Coal and rock roll behind a cowl 404 so that the exposed cut 415 is quickly covered in the region a few feet behind the cowl. Fortunately, the exposed cut immediately behind and somewhat under the cowl 404 remains free from debris which is useful.

Figure 19:
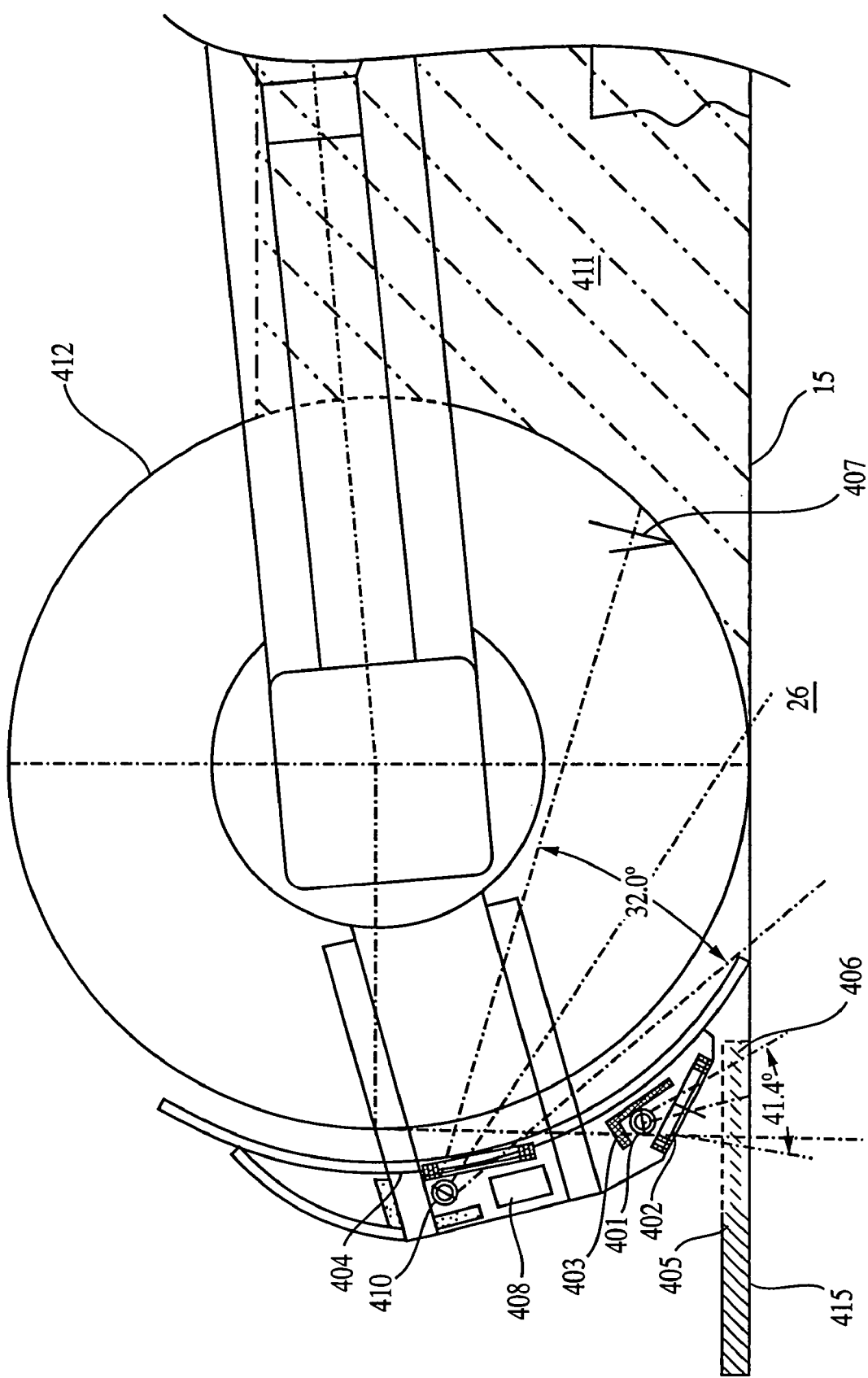
FIG. 19 is a schematic of a pair of rock detectors on the trailing shear of the long-wall miner of FIG. 18.

Geosteering is accomplished for the trailing drum 412 by placing a rock detector 401 on the back of the cowl 404 such that it can view the surface that has just been cut by the cutter drum 412. The purpose of this rock detector 401 is to differentiate between the condition when the cutter drum 412 is cutting into the floor rock, typically fire clay, from the condition when picks 407 of the drum 412 (FIG. 19) are above the floor so that coal is being left unmined. The rock detector 401 also can calculate the thickness of the coal being left. In effect, this rock detector 401 is measuring the distance that the cutter is separating from the coal/rock interface, or the amount of divergence between them. For that reason, this detector is referred to as the divergence rock detector 401. If the cutter is beginning to cut into the floor, indicating that the cutter 412 and the floor are moving toward each other, the detector 410 detects the rock that is being mined and mixed with the coal. This detector is referred to as the convergence rock detector 410.

The cowl 404 may be located close to the cutter picks 407, as close as three inches. In such a circumstance, the divergence rock detector 401 may actually be vertically beneath the cutter picks 407, thereby in a position between the picks and the coal.

As the miner moves forward, the cowl 404 drags on the newly cut surface 415, thus removing lumps of coal or rock and all but a small amount of coal dust. If the cutter 412 is cutting into the rock 26, the divergence detector 401 will not be able to measure any change in gamma readings. Therefore, the detector 401 will begin to raise the cutter 412 in small steps. For example, the rock detector 401 may give a command each 10 seconds to raise the cutter by 0.5 inches. If the miner 10 is moving at the rate of 30 fpm, then the cutter 412 will be raised approximately 0.1 inches for each foot of travel. Once the cutter tips 407 are raised above the coal/rock interface 15, no rock is being mined.

If the cutter 412 rises above the rock 26, coal will be left behind, unmined. Once the coal is approximately one inch thick, the divergence detector 401 will detect the layer of coal and stop raising the cutter 412. The detector will measure the thickness of the coal and then lower the cutter 412 by that amount. After 10 seconds, it will begin to raise the cutter 412 as before, in 0.5" steps, each 10 seconds and repeat the process.

Unless a convergence rock detector 410 is being used, the divergence rock detector 401 will continue to raise the drum 412 by 0.5 inches each 10 seconds. During this time, the coal/rock interface 15 may be rising either toward or dropping away from the cutter drum 412 and movements of the miner either add or subtract from these relative movements. These possible relative movements must be considered in selecting the rate at which the divergence rock detector 401 raises the drum 412. If the drum 412 is raised too rapidly, the cutter tips will quickly be sufficiently above the rock interface 15 so that coal is left unmined. If the drum is raised too slowly, at a time when there is rapid convergence between the cutter 412 and the floor interface 15, the cutter 412 may dig into the rock 26 faster than it is being raised out of the rock 26, until the rate of convergence decreases. Fortunately, this would be a rare condition, for a reasonable set of control parameters.

Floor conditions vary from mine to mine. Control parameters in the rock detector 401 are set to best fit the range of conditions that exist in each mine. Some floor conditions are very favorable for geosteering even though they may have traditionally been considered to be poor floor conditions for other types of mining systems. For example, in some mines, the coal is soft and is not bonded to the fire clay in the floor. As a result, whenever the cutter 412 is raised out of the floor, such that the picks 407 do not reach into the fire clay, the coal will continue to break away from the fire clay so that no coal is left unmined. This zone of cutting is called the break away zone. This condition may continue even when the cutter picks 407 are two inches or more above the fire clay, meaning that the break away zone may be as much as two inches or more.

Geosteering can mine almost all the coal and little or none of the rock when the breakaway zone is greater than one inch. If the cutter 412 is either cutting into the rock 26 or leaving coal unmined, there is a procedure employed by the rock detector 401 to recognize this condition and to return the cutter 412 to cut in the break away zone. Once in the break away zone, the accelerometer 60 inside the rock detector 401 monitors the angle of the cowl 404 so that any vertical movements of the cutter 412 are detected. The cowl 404 is riding on the top of the fire clay such that the position of the cutter 412 can be controlled relative to the fire clay. The rock detector 401 opens solenoid valves as required to raise or lower the cutter 412 in order to keep the tips of the picks 407 inside the break away zone. For each movement of the cutter 412, the rock detector 401 pulses the solenoids for a length of time that is calculated by the rock detector depending upon the response rate of the hydraulic system.

Unusual situations may arise from time to time. The geosteering must be robust to respond to these situations or, at least, quickly recover from any disruptions in the normal process. For example, the cutter 412 might move up more than commanded so that the soft coal is no longer being broken away from the fire clay, or the coal might have hard spots so that it remains bonded to the fire clay even though it is being cut very thin. In these cases, the divergence detector 401 will recognize a sudden change in gamma readings and respond by lowering the cutter by the thickness of the coal that it reads. Also, the accelerometer 60 will respond by reporting a change in the height of the cowl as it climbs upon the coal that is beginning to be left. This event can also be included in the logic.

The more difficult condition to protect against is for the cutter 412 to begin entering the rock 26 because the divergence detector 401 does see a change in gamma readings because it is already looking at fire clay with only a little dust on top. This is solved by performing repetitive cycling once the picks 407 have entered the breakaway zone. First, the cutter 412 is raised 0.5 inches. The accelerometer 60 immediately registers the cutter 412 being raised. After approximately six seconds the cowl 404 is seen, by the accelerometer 60, to be lifted up if the cutter 412 was in fire clay 26. If so, two seconds later, the rock detector 401 issues a command to raise by one inch. If, after approximately six seconds the cowl 404 jumps up again, reported by accelerometer 60, the detector 401 issues another up command. It would have to be a very unusual situation for this process to continue for very many steps. However, eventually the cutter 412 will be out of the rock and into the breakaway zone, even if the cutter 412 found itself a few inches in the fire clay. Once entering the breakaway zone, the next step up does not produce a change in the cowl 404 angle so that the rock detector 401 knows that it is in the breakaway zone of the formation. At this point, repetitive cycling occurs—once up by 0.5 inches followed by down by 0.5 inches. So long as the accelerometer 60 confirms that the cutter is in the desired breakaway zone, the cycling continues. Once the cowl 404 determines that the cutter 412 has exited the breakaway zone, and is in the fire clay again, the above sequence is repeated. Meanwhile, if control is temporarily lost and the cutter 412 begins leaving coal, the accelerometer 60 reports this condition, which is confirmed and corrected by the divergence detector 401, as explained earlier. The rock detector 410 has enough inputs and enough logic to regain control even if it is lost temporarily due to unusual events or conditions.

By this geosteering process, the rock detector keeps the drum adjusted at a height so that little or no rock is mined and little or no coal is left except for unusual, anomalous conditions. Note that the basis for control is a direct measurement of the formation being mined and the response by the rock detector is a direct result of the measurements. A guidance system for the long-wall shearing machine is not required, nor could it ever be nearly as accurate.

One significant benefit from geosteering the trailing cutter is that the need for an operator to steer the cutter is eliminated. Whenever the cutting system is reversed, the one operator that was controlling the leading cutting drum moves to the other end of the machine to control what was the trailing drum but is then the leading drum.

Under certain dynamic circumstances, the coal/rock interface 406 and the cutter picks 407 may converge quickly, resulting in more rock 405 being taken. If a particular mine faces this undesirable condition, a convergence rock detector 410 may be added to detect whenever large amounts of rock are being cut and mixed with the coal 411. Detection of this condition will result in the convergence rock detector 410 alerting the divergence rock detector 401 which will quickly raise the cutter picks 407. Since there is the possibility, in some mine conditions, for large amounts of rock to fall from the roof, the divergence detector 401 will override the convergence rock detector 410 in the event of a false signal.

Routing and protection of a power and signal cable to the divergence detector 401 is difficult due to the continual impact from rock and coal. To solve this problem, a battery 408 is installed in the cowl 404 to supply power to the divergence detector 401. Signals are transmitted to the miner control center by a radio link inside the detector 401 (not shown). A receiver module (not shown) in the miner control center translates the signals to open a solenoid to raise the cutter 412 or to open the solenoid to lower the cutter 412, as needed.

Since the cowl 404 is free to rotate 360 degrees so that it can be reversed whenever the machine is reversed, the divergence rock detector 401 must be disabled whenever the cowl 404 is rotated into the leading drum position. An accelerometer 60 is incorporated into the photometric module 58 that detects the orientation of the detector and disables its control capability once the detector 401 is rotated out of its operating position. Whenever the detector 401 is returned to the proper position for steering the trailing cutter 412 at the floor, the detector 401 reads the output of the accelerometer 60 and automatically activates the controls once the detector 401 has returned to its operating position.

It should be pointed out that in some cases, the accelerometer 60 may be a small solid state device that is incorporated within the electronics 57 inside the photometric module 58.

Figure 24:
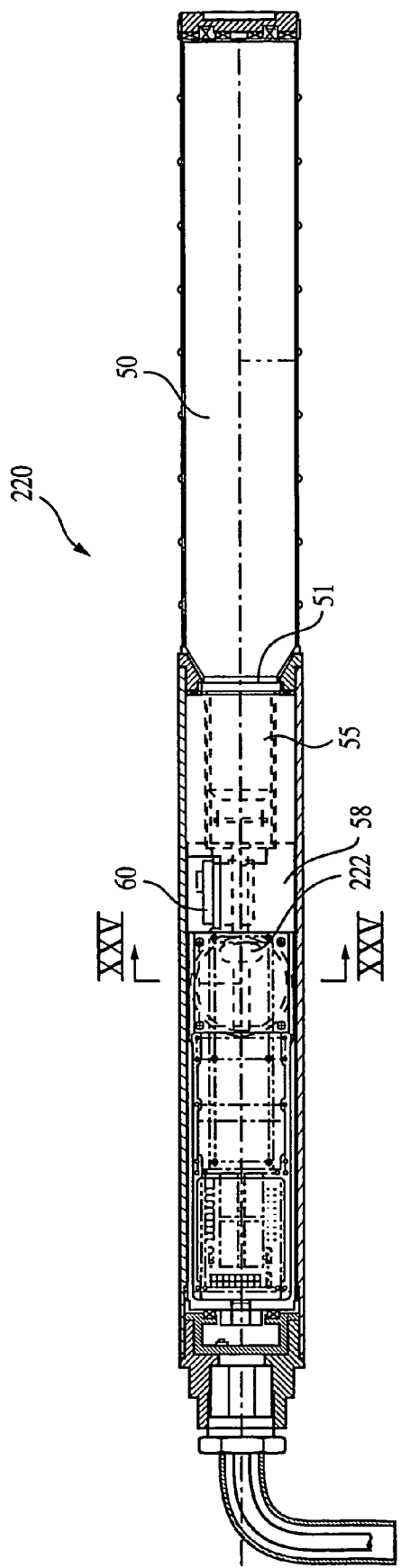
FIG. 24 is a cross-sectional view of a rock detector constructed in accordance with another embodiment of the invention.
Figure 25:
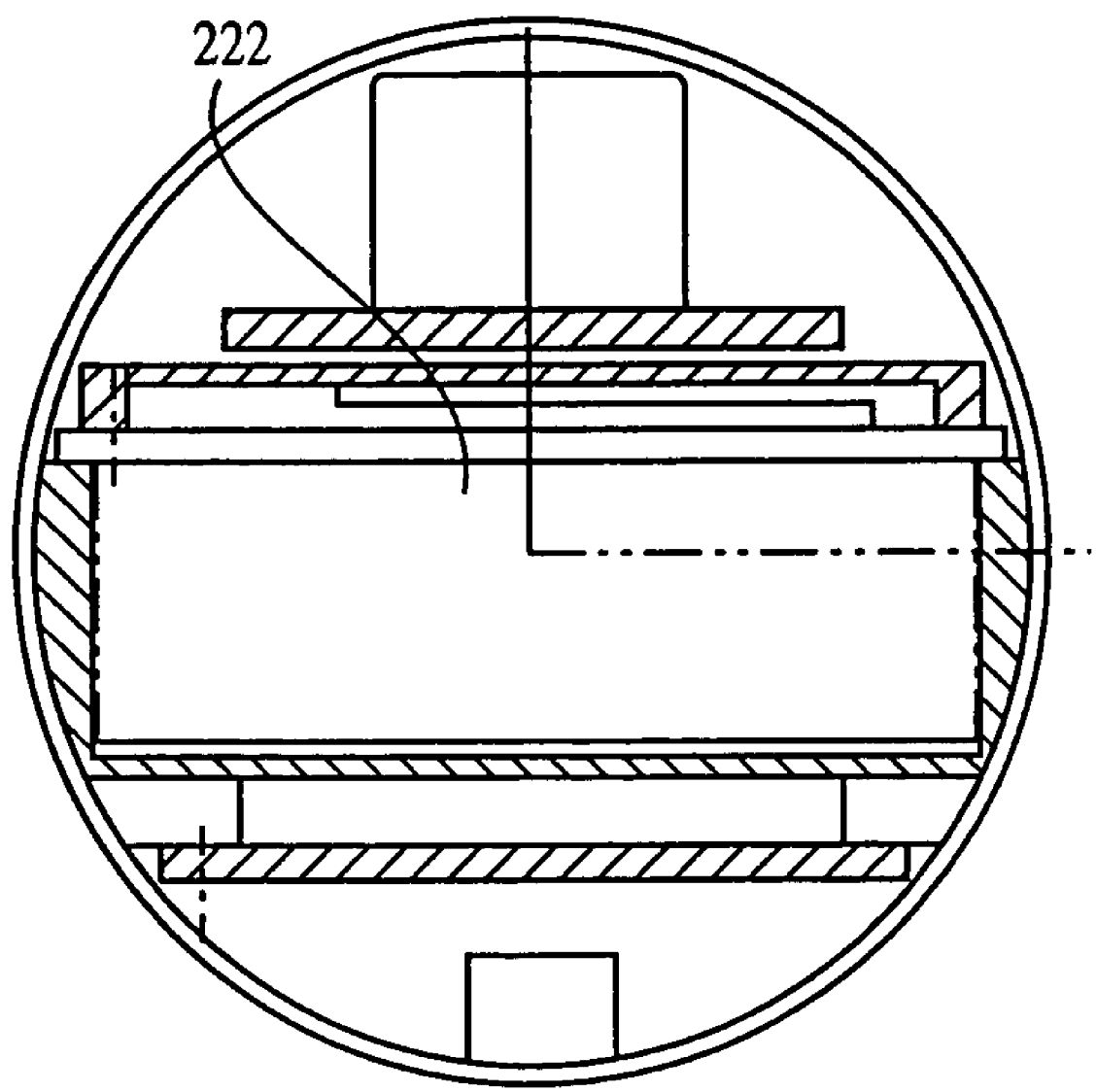
FIG. 25 is a cross-sectional view taken along line XXV-XXV of FIG. 24.

FIG. 24 illustrates a rock detector 220 constructed in accordance with another embodiment of the invention. Previously described rock detectors 20, 120 include an accelerometer 60 or a cutter motion indicator 300. The accelerometer 60 determines the angle of the boom 11 relative to gravity and therefore assists in determining the movement of the boom 11. The cutter motion indicator 300, with the optical encoder 303, determines the angular movement of the boom 11. The rock detector 220 includes the accelerometer 60 as well as a rate gyro 222 (FIGS. 24 and 25).

As described above, curve fitting of gamma radiation readings are an important aspect of the invention. The gamma radiation readings taken by the rock detectors are correlated with measurements of incremental movements of the cutter 12 toward the rock interfaces 15, 16. Since changes in the position of the cutter 12 can be equated with changes in the thickness of uncut coal in front of the advancing cutter 12, changes in the gamma radiation readings may be correlated to changes in position of the cutter 12. The rate gyro 222 measures incremental movements of the cutter 12. Specifically, the rate gyro 222 measures the rotation of the rock detector 220, and since the rock detector is mounted on the boom 11 the rotation of the rock detector 220 is the same as the rotation of the boom 11. The distance from the pivot pin 22 and the axis of the cutter 12 is fixed and so the movement of the rock detector 220 can be calculated. By integrating the output of the rate gyro 222 with other measured information, changes in the position of the cutter 12 and changes in the thickness of the uncut coal can be known.

An advantage of the rate gyro 222 is that its output is relatively insensitive to most vibrations. Only rotational vibration is measured, not lateral vibration, and rotational vibration can be easily filtered out of the output. Nonetheless, since the rate gyro 222 is unable to make an independent measurement of the actual orientation of the boom and since a rate gyro 222 accumulates errors over time, it may be used in conjunction with the accelerometer 60, as illustrate in FIG. 24. During brief periods of time when lateral vibration is minimal, the accelerometer 60 is used to determine actual orientation of the boom 11 relative to gravity. Then, the rate gyro 222 is used to determine angular rotation from that position, even under high vibration conditions.

The combination of the rate gyro 222 and the accelerometer 60 allows precise measurement of boom 11 movement over short periods of time, such as 0.1 seconds, and also allows determination of position over long periods of time as well. Short duration measurements allow the gamma radiation readings to be accurately correlated to incremental position changes so that curve fitting procedure is not significantly affected by the harsh vibration environment.

One methodology for the use of the rate gyro 222 includes automatically pausing the movement of the boom 11 when the cutter 12 has been determined to be only a few inches from the predicted location of one of the rock interfaces 15, 16. By pausing movement, the mechanical dynamics of the mining equipment are minimized for a moment of time. Excess coal is cleared away, the mining equipment settles to its nominal position, and the accelerometer 60 establishes the position of the boom 11 relative to the previous cutting stroke. From that point, the rate gyro 222, in combination with the accelerometer 60, accurately tracks the cutter 12 as it moves toward the rock interface 15, 16.

Although not illustrated, a second accelerometer 60 may be used in conjunction with the rock detector 220. The first accelerometer 60, within the rock detector 220, is utilized to measure the movement of the boom 11 relative to gravity. The second accelerometer 60, positioned on the mining equipment, is utilized to measure the angular movement of the mining equipment.

The above description and drawings are only illustrative of preferred embodiments of the present inventions, and are not intended to limit the present inventions thereto. For example, although there are significant technical and practical benefits derived from incorporating the logic elements within the explosion-proof housing of the rock detector, it should understood that this element of the geosteering system could be re-located into the control and display panel, or into the miner control system, or other chosen places on the continuous miner. Any subject matter or modification thereof which comes within the spirit and scope of the following claims is to be considered part of the present inventions.

What is claimed as new and desired to be protected by Letters Patent of the United States is:

1. An armored radiation detector for a solid mineral mining apparatus, comprising:
    a scintillation element for detecting radiation emitted from a material to be mined;
    a high strength armor assembly surrounding portions of said scintillation element;
    a window in said armor assembly adapted to allow gamma rays to reach said scintillation element,
    wherein said scintillation element has a length and a diameter such that said scintillation element has a ratio of said length over said diameter, and wherein said window in said armor assembly is along at least a portion of said length of said scintillation element.

2. The armored radiation detector of claim 1, wherein said scintillation element comprises a sodium iodide crystal.

3. The armored radiation detector of claim 1, wherein said ratio is approximately between 5 and 10.

4. The armored detector of claim 1, wherein said length is approximately 10 inches and said diameter is approximately 1.4 inches.

5. The armored detector of claim 1, wherein said length is approximately 10 inches and said diameter is approximately 2 inches.

6. The armored detector of claim 1, wherein said window comprises poly-ether, ether, ketone (PEEK).

7. The armored detector of claim 1, wherein said high strength armor assembly comprises case hardened steel that is adapted to attenuate gamma radiation.

8. The armored detector of claim 1, wherein said high strength armor assembly comprises a high strength steel alloy that is adapted to attenuate gamma radiation.

9. The armored detector of claim 1, wherein said high strength armor assembly is welded to said mining apparatus.

* * * * *